(12) United States Patent
Sarangdhar et al.

(10) Patent No.: US 10,402,565 B2
(45) Date of Patent: *Sep. 3, 2019

(54) IN-SYSTEM PROVISIONING OF FIRMWARE FOR A HARDWARE PLATFORM

(71) Applicant: Intel Corporation, Santa Clara, CA (US)

(72) Inventors: Nitin V. Sarangdhar, Portland, OR (US); Robert J. Royer, Jr., Portland, OR (US); Eng Hun Ooi, Georgetown (MY); Brian R. McFarlane, Hillsboro, OR (US); Mukesh Kataria, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/419,368

(22) Filed: Jan. 30, 2017

(65) Prior Publication Data

US 2017/0213034 A1    Jul. 27, 2017

Related U.S. Application Data

(63) Continuation of application No. 14/229,708, filed on Mar. 28, 2014, now Pat. No. 9,594,910.

(51) Int. Cl.
*G06F 21/57* (2013.01)
*G06F 9/44* (2018.01)
(Continued)

(52) U.S. Cl.
CPC .......... *G06F 21/572* (2013.01); *G06F 9/4403* (2013.01); *G06F 9/4406* (2013.01);
(Continued)

(58) Field of Classification Search
CPC ...... G06F 21/572; G06F 21/57; G06F 21/575; G06F 9/4411; G06F 9/4403; G06F 9/4406; G06F 11/1417
See application file for complete search history.

(56) References Cited

U.S. PATENT DOCUMENTS 5,714,768 A * 2/1998 Ovshinsky .............. G11C 11/56 257/4
6,212,602 B1    4/2001 Wicki et al.
(Continued)

FOREIGN PATENT DOCUMENTS

CN    1226060 A    8/1999
CN    1577252 A    2/2005
(Continued)

OTHER PUBLICATIONS

International Preliminary Report on Patentability, PCT/US2015/023175, dated Oct. 13, 2016, 7 pages.
(Continued)

*Primary Examiner* — Stefan Stoynov
(74) *Attorney, Agent, or Firm* — Compass IP Law, PC

(57) ABSTRACT

A hardware platform includes a nonvolatile storage device that can store system firmware as well as code for the primary operating system for the hardware platform. The hardware platform includes a controller that determines the hardware platform lacks functional firmware to boot the primary operating system from the storage device. The controller accesses a firmware image from an external interface that interfaces a device external to the hardware platform, where the external device is a firmware image source. The controller provisions the firmware from the external device to the storage device and initiates a boot sequence from the provisioned firmware.

30 Claims, 11 Drawing Sheets

(51) Int. Cl.
*G06F 11/14* (2006.01)
*G06F 9/4401* (2018.01)

(52) U.S. Cl.
CPC ........ *G06F 9/4411* (2013.01); *G06F 11/1417* (2013.01); *G06F 21/57* (2013.01); *G06F 21/575* (2013.01); *G06F 2212/1052* (2013.01); *G06F 2221/03* (2013.01); *G06F 2221/033* (2013.01)

(56) References Cited

U.S. PATENT DOCUMENTS

| | | | |
|---|---|---|---|
| 7,043,664 | B1 | 5/2006 | Chiloyan |
| 7,069,431 | B2 | 6/2006 | Dayan et al. |
| 8,065,510 | B2 | 11/2011 | Hanes |
| 8,214,653 | B1 | 7/2012 | Marr et al. |
| 8,555,273 | B1 | 10/2013 | Chia et al. |
| 2003/0106052 | A1 | 6/2003 | Morrison et al. |
| 2004/0103347 | A1 | 5/2004 | Sneed et al. |
| 2005/0229173 | A1 | 10/2005 | Mihm et al. |
| 2007/0022243 | A1 | 1/2007 | Rudelic |
| 2009/0006757 | A1 | 1/2009 | Singhal et al. |
| 2010/0199078 | A1 | 8/2010 | Shih et al. |
| 2010/0325498 | A1 | 12/2010 | Nagadomi |
| 2012/0166891 | A1 | 6/2012 | Dahlen et al. |
| 2013/0268746 | A1 | 10/2013 | Hsu |
| 2014/0047175 | A1 | 2/2014 | Abali et al. |
| 2014/0047430 | A1 | 2/2014 | Kanematsu |
| 2014/0089659 | A1 | 3/2014 | Brickell et al. |
| 2014/0173327 | A1 | 6/2014 | Dasari et al. |
| 2014/0310509 | A1 | 10/2014 | Potlapally et al. |
| 2015/0113321 | A1 | 4/2015 | Huang et al. |
| 2015/0248296 | A1 | 9/2015 | Zhang et al. |

FOREIGN PATENT DOCUMENTS

| | | | |
|---|---|---|---|
| JP | 2003099146 | | 4/2003 |
| JP | 2005353149 | A | 12/2005 |
| JP | 2006501581 | A | 1/2006 |
| KR | 1020090101921 | | 9/2009 |
| WO | 2008125634 | A1 | 10/2008 |
| WO | 2013095639 | A1 | 6/2013 |
| WO | 2015149020 | A1 | 10/2015 |

OTHER PUBLICATIONS

International Search Report and Written Opinion for PCT Patent Application No. PCT/US2015/023175, dated Jul. 10, 2015, 10 pages.
Mmel 8-megabit 2.7-Volt Minimum SPI Serial Flash Memory data sheet, AT26DF081A, Jun. 2009.
English Translation of the Notice of Preliminary Rejection, Application No. 10-2016-7023550, dated Mar. 21, 2017, 7 pages.
Advisory Action for U.S. Appl. No. 14/229,708, dated Oct. 20, 2016, 3 pages.
Notice of Allowance for Korean Patent Application No. 10-2016-7023550, dated Oct. 27, 2017, 2 pages.
Final Office Action for U.S. Appl. No. 14/229,708, dated Jul. 13, 2016, 15 pages.
Notice of Allowance for U.S. Appl. No. 14/229,708, dated Oct. 31, 2016, 5 pages.
Office Action for U.S. Appl. No. 14/229,708, dated Mar. 24, 2016, 12 pages.
Translation of Notification of Reasons for Refusal for Japanese Patent Application No. 2016-553650, dated Sep. 15, 2017, 5 pages.
Extended European Search Report for Patent Application No. 15769576.6, dated Sep. 26, 2017, 17 pages.
Chinese and English Translation of P.R. China State Intellectual Property Office First Office Action for Patent Application No. 201580010756.7, dated Sep. 5, 2018, 23 pages.
Shohei, et al., "Consideration Related to New Data Storage Method Using Main Memory", The 76th National convention of Information Processing Society of Japan, Tokyo Metropolitan University and Technology Joint Corporation, Mar. 11, 2014, National-conference lecture collected papers, pp. I-213, I-214, English and Japanese translations, 11 pages.
Extended European Search Report for Patent Application No. 15769577.6, dated Oct. 5, 2017, 9 pages.

\* cited by examiner

IN-SYSTEM PROVISIONING OF FIRMWARE FOR A HARDWARE PLATFORM

RELATED CASE INFORMATION

The present application is a Continuation of, and claims the benefit of priority of, U.S. patent application Ser. No. 14/229,708, filed Mar. 28, 2014.

FIELD

Embodiments of the invention are generally related to system firmware provisioning, and more particularly to provisioning hardware platform firmware when components are in-system in the hardware platform.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2014, Intel Corporation, All Rights Reserved.

BACKGROUND

Computing devices have hardware platforms on which a variety of components are coupled together to provide the functionality for the computing device. Commonly, computing devices include a processor, short term memory (volatile memory), and longer-term memory (nonvolatile storage). Typically one or more components on the hardware platform executes basic initial code stored in a read only memory (ROM), which allows the hardware platform to load firmware that controls the hardware components. The firmware then loads code and data (such as a host operating system) from storage into the volatile memory for execution by the processor.

Firmware is traditionally stored in separate components (e.g., a flash storage device) that add cost in terms of the components themselves, as well as additional design and manufacturing costs to put the components on the hardware platform. The ROM code is fixed in hardware and cannot replace the role of firmware on modern computing platforms. Thus, without the firmware on the hardware platform, the platform is traditionally unable to initiate operation. Furthermore, if the firmware code is somehow compromised by corruption or attack, there are limitations on the ability to perform recovery of the hardware platform.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
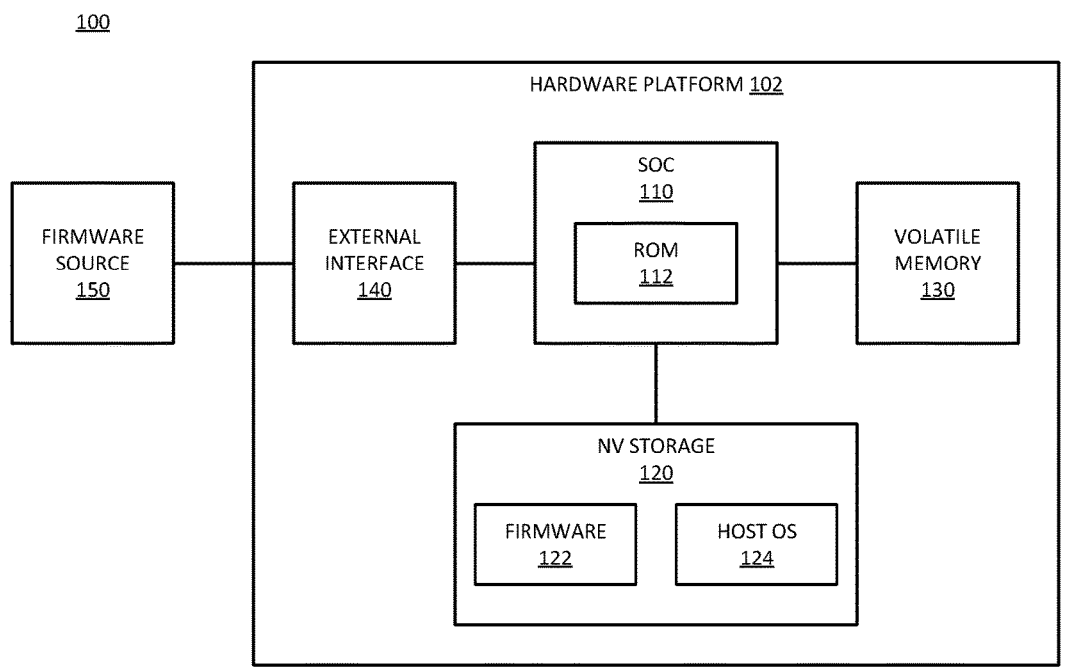
FIG. 1 is a block diagram of an embodiment of a system that provisions firmware onto a nonvolatile storage device.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a hardware platform includes a nonvolatile storage device that can store system firmware for initial startup operations, as well as code for the primary operating system for the hardware platform. In a normal boot sequence, a controller on the hardware platform loads functional firmware from the storage device to initiate the hardware platform. In certain circumstances, the storage device may not store functional firmware. Thus, the controller determines the hardware platform lacks functional firmware to boot the primary operating system from the storage device, and initiates operations to provision a firmware image from an external firmware source. The controller accesses a firmware image from the external source via an interface to a device external to the hardware platform. The controller provisions the firmware from the external device to the storage device and initiates a boot sequence from the provisioned firmware. The controller can implement security procedures to ensure that security of the platform is maintained during the provisioning of the firmware, as well as after the firmware has been provisioned.

The hardware platform stores firmware on the storage device, and thus does not need a separate component such as a flash memory to store the firmware. Without firmware on the hardware platform, the hardware platform is considered to be "bare metal." A bare metal hardware platform refers to a hardware platform that only includes hardware components, and does not include writable firmware components. The hardware components can include ROM (read only memory) devices. The hardware components can also include components that are for storing firmware and software, but without being pre-loaded with the writable firmware. Therefore any software stored on the platform would be inaccessible for execution. The ROM can provide control logic (or read-only executable firmware) to access and provision firmware for the hardware platform. The hardware platform may lack functional firmware due to one of the following firmware "lifecycle" events: initial boot after manufacturing, firmware corruption, platform failure, firmware update, or an upgrade or change of the hardware component that stores the firmware.

When the computing device is powered up or power-cycled or transitions from a sleep or low power state to an operational state, the electronic components on the platform that have code (e.g., ROM code and/or firmware) also transition from a state of being powered down or in a low power state to being in a powered up or operating state. The transition from low or no power to being powered up is commonly referred to as "waking up." When an electronic component wakes up, it initiates its ROM code if it has any. For components that generally rely on firmware for initial operation (e.g., a storage device, a manageability engine or other platform controller, a processor or the system itself), its ROM code includes logic to cause the component to address a location expected to store a firmware image. When the component finds a valid firmware image at the location, the firmware loads and executes. As described herein, the location of the firmware is the nonvolatile storage device. Such access can be possible when the nonvolatile storage device includes an interface that allows it to be accessed like a volatile memory device. As described herein, when the firmware image is missing or not valid, the hardware platform controller accesses the firmware from a source external to the hardware platform. The platform controller includes ROM code that enables it to access the external interface when there is not a valid image stored on the nonvolatile storage device.

Next generation nonvolatile storage technology is expected to have reduced access times relative to current generation nonvolatile storage technology. Certain next generation nonvolatile storage devices are expected to have access times comparable to current generation volatile memory devices, which are generally more than an order of magnitude faster than current generation nonvolatile storage device access times. Thus, next generation nonvolatile storage devices (referred to as NGDs or next generation devices as a shorthand) could be accessed with an interface consistent with volatile memory access commands. In one embodiment, NGDs could be directly mounted on a hardware platform (e.g., as part of a "chipset") rather than via a traditional storage interface. NGDs can have capacities comparable to current generation nonvolatile storage devices, and be directly accessible via a different interface. Thus, NGDs can reduce or eliminate the need for flash devices to store firmware. Current firmware size is generally much less than 1 percent of capacities of expected NGDs.

Thus, NGDs could store the firmware if they had appropriate interfaces and if there was a mechanism to provision the firmware to the storage devices. Additionally, the NGDs can store backup copies of the firmware to aid in recovery.

In one embodiment, ROM code in the platform controller and the NGD can allow the devices to communicate with each other across a next generation device interface (NGI). Traditionally the platform flash device that stores the firmware also stores training information for using a high speed interface. It will be understood that high speed interfaces typically have to be "trained" in that specific timing parameters need to be set to enable the exchange of high speed signals. Without a flash device, there will not be training data stored for the interface. Without training data, the timing of the signaling between the two devices would almost certainly lack the synchronicity necessary to properly transmit and receive commands and data. In one embodiment, the ROM code in the platform controller and the NGD enters a low speed communication mode or state to train the interface, and then engages a high speed mode or state to provision the firmware. In one embodiment, the training of the interface can be considered an initial provisioning of the firmware. Such a training mechanism can be used for an initial boot as well as for a recovery operation.

In one embodiment, the platform controller manages the interface with one or more security mechanisms, which are described in more detail below. Briefly, the security mechanisms can ensure that the provisioning is performed under a secure environment. The security can also provide protection against replay attacks.

In one embodiment, the hardware platform is a system that is configured as a two-level memory (2LM) system, or a system with two levels of memory. In a 2LM configuration, the hardware platform can include a first level of memory that can be referred to as near memory. In one embodiment, the near memory is implemented as a volatile memory. The hardware platform can also include a second level of memory that can be referred to as far memory. In one embodiment, the far memory is implemented as a nonvolatile memory. Far memory is larger and slower than near memory. Near memory can provide a low latency and high bandwidth cache for far memory.

In one embodiment, near memory is managed by a near memory controller (NMC) over a near memory interface (NMI), and far memory is managed by a far memory controller (FMC) over a far memory interface (FMI). In one embodiment, the FMC reports the far memory as main memory to a host operating system that is to execute on the hardware platform. In such an implementation, the near memory can operate as a transparent cache of the far memory, and the host operating system does not need to be separately configured to recognize or address the near memory. In one embodiment, the nonvolatile storage is implemented as a next generation memory, and interfaces with the processor via a next generation interface (NGI). In one embodiment, a next generation interface (NGI) is a far memory interface.

The NGD can be or include any of the following memory technologies. In one embodiment, the NGD is a three dimensional cross point memory device. Unlike a block based flash memory based device, a three dimensional cross point memory device is byte addressable and can be used to replace DRAM (dynamic random access memory) as main memory for a system. The NGD could include other byte addressable memory technologies, including but not limited to phase change memory (PCM), three dimensional cross point memory, resistive memory, nanowire memory, ferroelectric transistor random access memory (FeTRAM), magnetoresistive random access memory (MRAM) that incorporates memristor technology, spin transfer torque (STT)-MRAM, or other byte addressable memory device, or a combination. Use of such nonvolatile memory can enable the memory to be used as system main memory, as well as allowing the storing of the firmware image for system boot, and to store the host OS, applications, and/or other programs.

Details about 2LM systems, near memory, far memory, and FMIs can be found in U.S. patent application Ser. No. 12/976,545, filed Dec. 22, 2010, entitled "Two-Level System Main Memory," and assigned to the same corporate entity as the present patent application. An embodiment of a 2LM system can be implemented in any embodiment of a system described herein, where such 2LM system and the FMI as an NGI can be understood in accordance with what is described in that patent application.

FIG. 1 is a block diagram of an embodiment of a system that provisions firmware onto a nonvolatile storage device. System 100 includes hardware platform 102 and external firmware source 150 coupled to hardware platform 102. Hardware platform 102 represents a hardware platform on which a processor, a nonvolatile storage device, and an external hardware interface are coupled together for any type of computing device or computing system. Hardware platform 102 can be incorporated into any of a variety of computer systems, handheld devices, commercial electronics, consumer electronics, or other devices.

In one embodiment, hardware platform 102 includes a system on a chip (SOC) design that includes the processing resources. It will be understood that an SOC can also be implemented on a hardware platform as separate components. SOC 110 represents a primary processor device or host processor device, such as a central processing unit (CPU), for hardware platform 102. SOC 110 can also be understood to include a platform controller device. In one embodiment, the processor device is the platform controller. In one embodiment, SOC 110 includes both a processor device, and a separate controller device. It will be understood that the controller device can be implemented as a processor device, which can be specific for controlling the platform, rather than a general purpose processor. The host processor executes operations or executes a host operating system to control the system in which hardware platform 102 is incorporated.

SOC 110 includes ROM 112, which represents hard-coded logic on SOC 110 to initiate the boot up or initialization of a computing system in which hardware platform 102 is incorporated. ROM 112 includes logic to initiate the operation of one or more devices on SOC 110 when the SOC is powered on. It will be understood that in addition to SOC 110 being powered on, the ROM code or logic of ROM 112 could also execute when SOC 110 transitions from a low power or sleep state to a normal operating state. ROM 112 includes logic sufficient to access firmware for SOC 110. In system 100, the firmware for SOC 110 is firmware 122, stored in nonvolatile (NV) storage 120. Storage 120 is nonvolatile in that its contents remain deterministic even if power is interrupted to the storage device. Contrast nonvolatile storage 120 with volatile memory 130. Memory 130 is considered volatile in that its contents become indeterminate if power is interrupted for more than a short period of time (on the order of fractions of a second).

In traditional systems firmware is stored in a flash device and the host operating system is stored in a separate storage device, storage 120 stores both system firmware 122 and host operating system (OS) 124. Thus, storage 120 is a primary nonvolatile storage device for hardware platform 102. Firmware 122 provides the initial software and logic to load host OS 124. Firmware 122 can also provide other logic for operation of hardware platform 102, such as basic operations to interconnect the components of the platform. One or more portions of firmware 122 can operate parallel to, and in the background of, host OS 124.

Volatile memory 130 can store volatile, working images of code as well as working data for execution of hardware platform 102. More particularly, memory 130 stores images of host OS 124 as well as images of applications stored in storage 120 for execution by a host processor. Memory 130 is typically limited to being a fraction the storage capacity of storage 120. In one embodiment, storage 130 is a next generation storage device (NGD) that has access times comparable to memory 130. Despite having similar access times and much more storage, hardware platform 102 can include both memory 130 and NGD storage 120. In one embodiment, storage 120 can decode memory access commands. Thus, SOC 110 can include an interface to storage 120 that allows both traditional storage access commands as well as memory access commands to be passed to storage 120.

External interface 140 represents a hardware interface on hardware platform 102 that enables hardware platform 102 to connect to external devices. In one embodiment, external interface 140 is a universal serial bus (USB) port on hardware platform 102. However, it will be understood that external interface 140 could be another type of hardware interface such as an Ethernet port or other network interface, a wireless interface device, another device-to-device bus (such as Firewire or other interconnects), or a proprietary external interconnect. In one embodiment, SOC 110 includes external interface 140. Thus, external interface 140 can be a hardware circuit built directly into a host processor system, allowing the platform controller to directly access the interface. Hardware interface 140 can be an interface to a port connector that is in addition to other hardware interfaces to the same port connector. Firmware source 150 represents a device external to hardware platform 102 that interfaces with the platform via hardware interface 140. Thus, firmware source 150 includes a compatible connector interface that enables it to be accessed via external interface 140.

In normal operation, firmware 122 exists (is stored in) storage 130, and is valid. However, any of several lifecycle events could present a circumstance where firmware 122 is missing or corrupted. Another lifecycle event occurs when firmware 122 is valid and functional, but should updated. Such events can include manufacturing of hardware platform 102, field update of firmware 122 (e.g., a new version of BIOS (basic input/output system) or other firmware), field upgrade (e.g., upgrading from a 160 GB storage device to a 320 GB storage device), or a refurbish or corruption event where firmware 122 is illegally modified (e.g., an attack) or a portion of firmware 122 is missing due to disk error. Thus, in any of these circumstances, firmware 122 is not considered to be functional firmware, because it is missing or corrupted, or it cannot be executed because it is being replaced by a newer version.

In one embodiment, when ROM 112 encounters an error accessing a valid firmware image from storage 120, ROM 112 includes logic to cause it to access firmware source 150 via external interface 140. The hardware platform controller can then provision the firmware from firmware source 150 onto storage device 120. More details with respect to provisioning the firmware from an external source are provided below. Once firmware 122 is provisioned to storage 120, hardware platform 102 can load the firmware and initiate a boot sequence from the provisioned firmware.

In one embodiment, system 100 is configured as a two-level memory (2LM) system, or a system with two levels of memory. In a 2LM configuration, system 100 can include nonvolatile storage 120 as far memory and volatile memory 130 as near memory. Thus, in one embodiment, volatile memory 130 can be used as a cache for nonvolatile storage 120. In one embodiment, the far memory is controlled by a next generation interface, which can be a far memory interface (FMI) connecting nonvolatile storage 120 to SOC 110.

Figure 2:
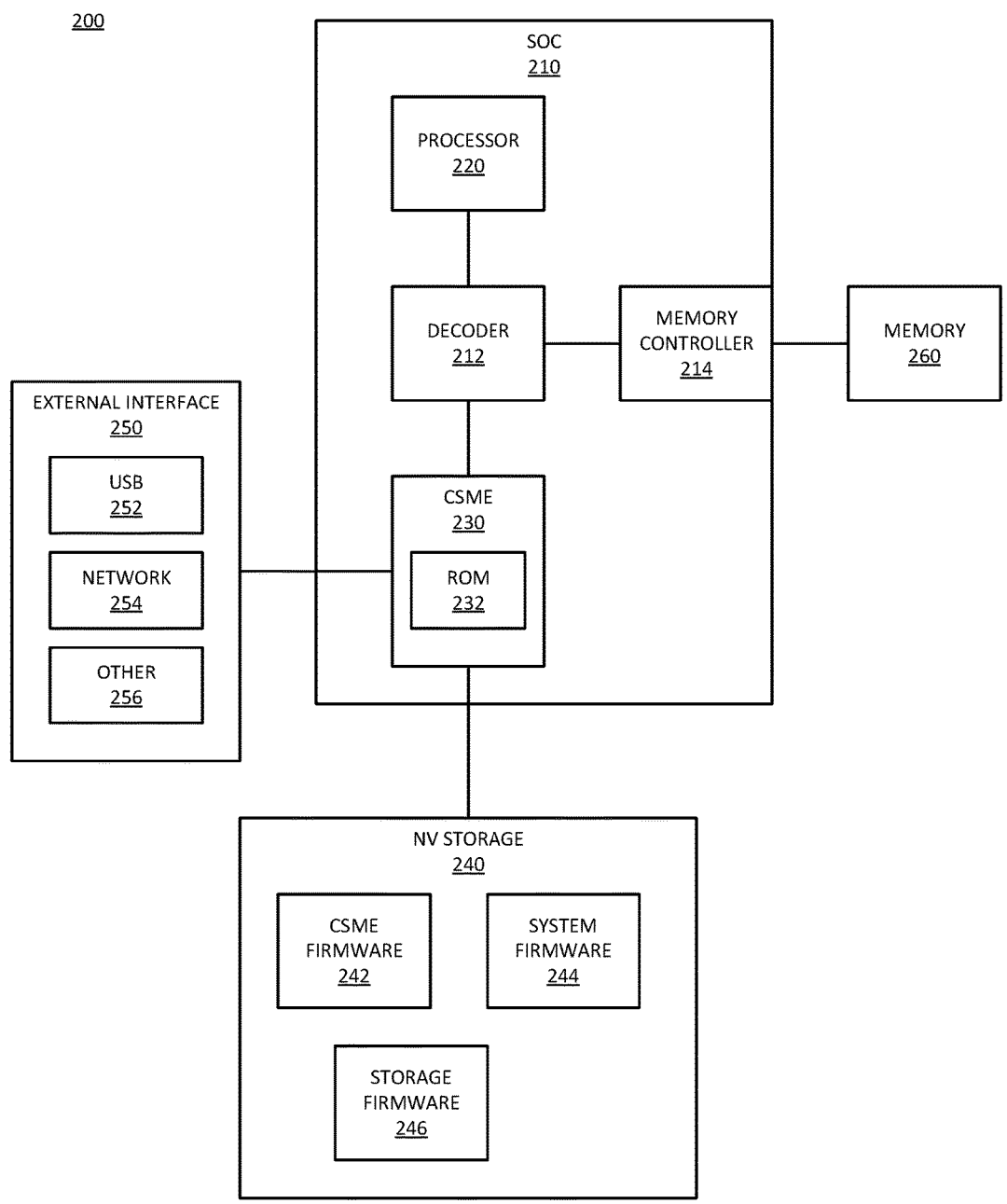
FIG. 2 is a block diagram of an embodiment of a computing system with a manageability engine that coordinates firmware provisioning from a source external to the computing system.

FIG. 2 is a block diagram of an embodiment of a computing system with a manageability engine that coordinates firmware provisioning from a source external to the computing system. System 200 represents a hardware platform, and can be one example of hardware platform 102 of FIG. 1. Not every element of system 200 will be present in every implementation. In one embodiment, system 200 includes SOC 210, which includes processor 220, decoder 212, memory controller 214, and CSME 230. In one embodiment, system 200 includes the elements of SOC 210 as separate components not configured in a system on a chip. In one embodiment, system 200 includes equivalent component structures to what is shown in SOC 210.

Processor 220 is a host processor or host processing unit for system 200. Processor can be a single- or multi-core device. Processor 220 typically executes instructions from a cache device (not specifically shown) and/or from memory 260. Memory 260 represents a volatile memory device, and is accessible via memory controller 214. Memory controller 214 represents logic that generates memory access commands based on requests for data as decoded by decoder 212. Decoder 212 provides decoding of instructions executed by processor 220, which affects data stored in system 200. In one embodiment, memory 260 accesses nonvolatile storage 240 via a direct access path (not specifically shown) when an instruction related to data or code not cached in memory 260.

CSME 230 represents a manageability engine. A manageability engine is one type of hardware platform controller. In one embodiment, CSME 230 can be a converged security and manageability engine, which includes logic to perform operations related to both security on hardware platform system 200 as well as management of access to resources on the hardware platform. For purposes of system 200, CSME 230 determines that the hardware platform whether the hardware platform includes valid or functional firmware on nonvolatile storage device 240. In one embodiment, CSME 230 accesses external interface 250 to obtain firmware if the hardware platform lacks functional firmware. In one embodiment, storage 240 stores a primary firmware image and one or more backup firmware images. Thus, CSME 230 can first determine whether storage 240 includes a functional or operational primary firmware image. If there is no functional primary firmware image, CSME 230 can request storage 240 to obtain a backup or secondary firmware image. If there is no functional firmware image, CSME 230 accesses external interface 250 to obtain a firmware image. In one embodiment, SOC 210 does not include CSME 230, and would include ROM code and/or a controller device to access firmware, which could perform the operations described with respect to accessing and provisioning firmware.

Storage 240 can include firmware for any component on the hardware platform that uses firmware. For example, in one embodiment, storage 240 stores one or more firmware images (e.g., a primary and one or more backups each) for CSME 230, storage device 240, and processor 220. As illustrated, CMSE firmware 242 represents the firmware for CSME 230. When the CSME 230 begins to operate, it executes ROM code 232. ROM code 232 will attempt to access CMSE firmware 242. System firmware 244 represents firmware for processor 220, which could also be firmware for the entire system. For example, system firmware 244 could represent BIOS for the host processor to execute in preparation for loading a host OS. Storage firmware 246 represents firmware to be executed by a controller in the storage device itself (not explicitly shown). If storage 240 fails to find its own firmware, its ROM code (not specifically shown) can generate a message to CSME 230 (the platform controller) to indicate that it cannot access a functional firmware image. CSME 230 can then access external interface 250 to obtain a firmware image.

In one embodiment, CSME 230 initiates execution of system firmware 244, and will thus determine whether or not a functional firmware image exists. In one embodiment, processor 220 includes a ROM and may initiate its own firmware, in which case it can indicate to CSME 230 that it lacks firmware. CSME 230 can then access external interface 250 to obtain a firmware image. Thus, CSME 230 first accesses storage 240 for a firmware image, and if storage 240 does not have a valid firmware image, CSME 230 accesses the external interface to obtain the firmware image. In contrast, in traditional systems the platform controller would access a flash device to access firmware. Thus, it will be understood that CMSE 230 or processor 220 or another controller of SOC 210 will attempt to access firmware for the system and/or the controller device itself. In one embodiment, CMSE 230 or processor 220 or another controller of SOC 210 will attempt to access firmware for processor 220, if such firmware is separate from system firmware.

External interface 250 represents any one or more hardware interfaces which CSME 230 can access directly via ROM 232. Typically ROM 232 would be configured to access a single external interface for provisioning firmware. In one embodiment, ROM 232 could be configured to access multiple different hardware interfaces to obtain a firmware image to provision. In the case that ROM 232 is configured to access multiple different interfaces, it will be understood that there could be a preference order configured, in which one interface is attempted first, and a next interface is attempted if the first interface does not include a valid firmware image. Examples of external interface 250 can include, but are not limited to, USB 252, network interface 254, and other interface 256. Network interface 254 can include a wide area network interface, a local area network interface, a wired interface, a wireless interface, or some combination of interfaces. Other interface 256 can represent an interface not specifically identified, including proprietary interfaces configured to provide an external source for a firmware image.

Figure 3:
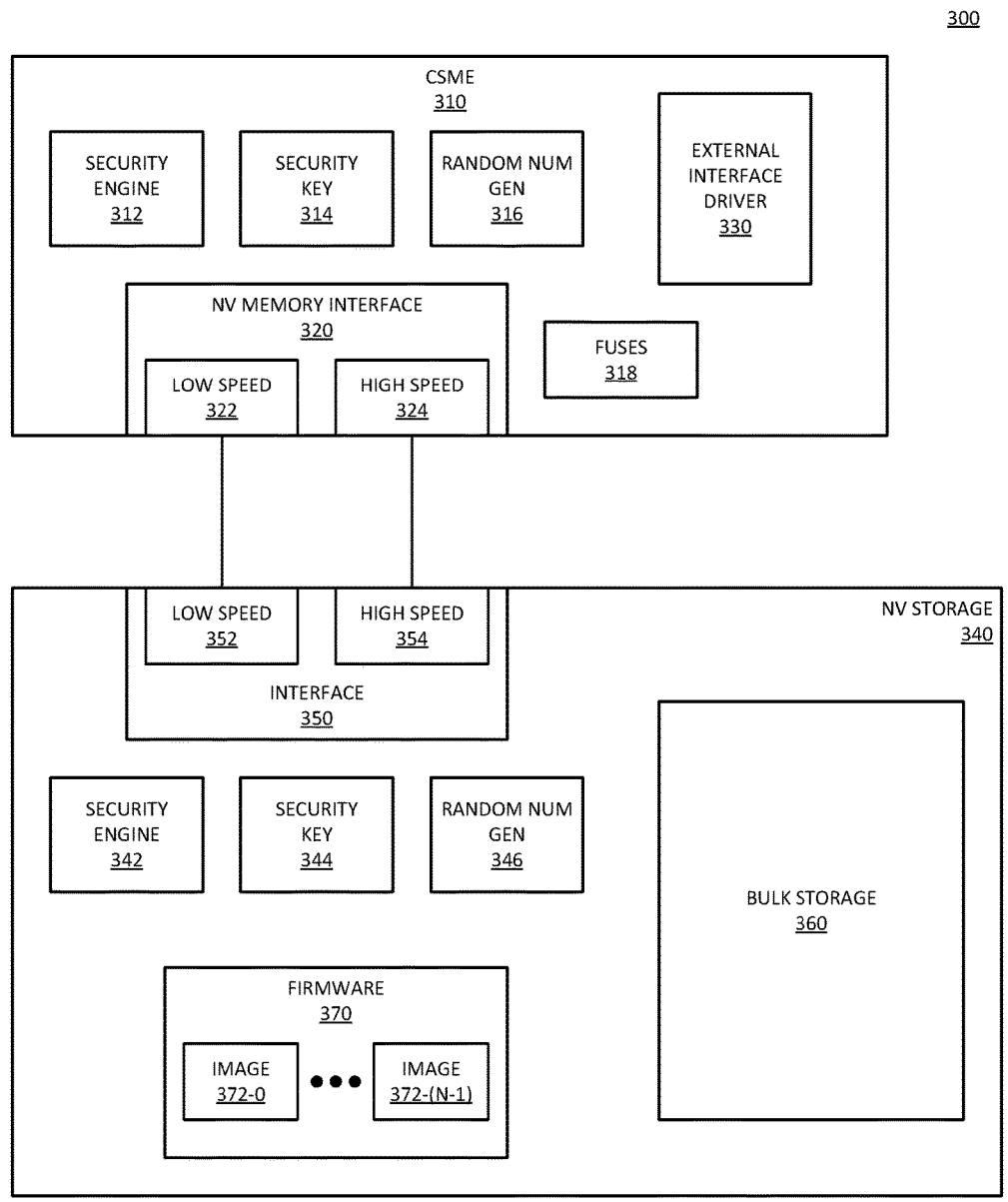
FIG. 3 is a block diagram of an embodiment of a system in which a manageability engine interfaces with a nonvolatile storage device.

FIG. 3 is a block diagram of an embodiment of a system in which a manageability engine interfaces with a nonvolatile storage device. System 300 represents elements of a hardware platform, and can be an example of elements of system 200 of Figure or system 100 of FIG. 1. More particularly, system 300 includes CSME 310, which represents a manageability engine or platform controller for a computing device. It will be understood that CSME 310 can be implemented as one or multiple discrete elements, and can be more or less complex than what is illustrated in system 300. In one embodiment CSME 310 is integrated with a host processor (not shown) as a system on a chip and/or a multi-chip package.

In one embodiment, CSME 310 is or includes a processor device or controller device. CSME 310 includes ROM code (not specifically shown in system 300) that initiates operation whenever CSME 310 is powered up or wakes from a low power state. The ROM code for a platform controller is traditionally very basic, and allows the controller to access its firmware. The ROM code for CSME 310 includes the same basic functionally as traditionally provided, and can also determine if there is not functional firmware on the platform, and provision firmware from an external source.

In one embodiment, CSME 310 includes external interface driver 330. Driver 330 can be a controller for a hardware interface that is provided directly on CSME 310. Thus, CSME 310 can directly control the external interface for provisioning firmware. In an alternate embodiment, CSME 310 accesses the external interface via a hardware controller that is off-chip from CSME 310 with logic in its ROM code. External interface driver 330 can be, for example, hardware to drive to a USB port. Alternatively, driver 330 can drive a different type of bus or interface as described above. Driver 330 can be in addition to other drivers within the hardware platform for the same interface. In one embodiment, CSME 310 only accesses driver 330 when it determines that the hardware platform lacks functional firmware. Otherwise, CSME 310 can keep driver 330 in a high-impedance or other inactive state to prevent loading the interface.

In one embodiment, CSME 310 receives requests from a host processor that would traditionally be sent to a flash device. For example, commands that would traditionally be sent to a flash device for reading, writing, and/or erasing the flash during a boot flow can be sent to nonvolatile (NV) storage device 340 via CSME 310. CSME 310 interfaces with storage device 340 through nonvolatile memory interface 320. In an embodiment where storage device 340 is a next generation device (NGD), interface 320 can also be referred to as a next generation device interface (NGI). Storage device 340 includes interface 350, which corresponds to memory interface 340, and provides a mating interface. Examples of commands that interface 320 can send to storage device 340 for purposes of boot-up can include: Read, Write, Erase, Read SFDP, Read JEDEC ID, Read Status, and Write Status.

In one embodiment, interface 320 of CSME 310 and interface 350 of storage device 340 both support low speed operation and high speed operation. Low speed 322 and low speed 352 represent low speed operation or a low speed mode, while high speed 324 and high speed 354 represent the high speed operation or high speed mode. It will be understood that "low speed" and "high speed" are relative terms. In general as used herein, high speed indicates communication speeds over an interface that requires training to find settings to be able to meet communication tolerances. Low speed indicates communication speeds where the tolerances are wide enough that training is not generally required to find proper interface settings. Thus, low speed operation can be engaged without training while high speed operation requires settings that are found through training. Training refers to exchanging known messages over the interface and testing for proper transmission and reception. Training tends to be iterative to test multiple different settings and select the setting(s) that provide the best results (e.g., fewest errors or lowest percentage of errors over a time period or amount of data). In one embodiment, low speed mode 322 and high speed mode 324 use the same hardware interface mechanisms (e.g., channels, pins, registers, drivers, and other resources), but differ in how the interface is operated (e.g., using a high-speed clock, using different settings for reading/decoding).

In one embodiment, the interface configuration data is received in a default low speed mode, which then allows interfaces 320 and 350 to prefer to use high speed communication or a high speed mode 324, which enables greater throughput. In one embodiment, CMSE 310 determines if it has training data or settings stored to enable high speed mode 324. In one embodiment, the training data includes timing parameters or timing settings for the interface. The timing parameters can indicate how to synchronize sampling signals to ensure that data sampling by the receiver aligns with data transmission timing by the transmitter.

If CSME 310 determines interface 320 is not trained, CSME 310 engages low speed mode 322 for initial communication with storage device 340. In one embodiment, CSME 310 attempts high speed mode 324, but discovers that storage device 340 does not support high speed mode 354. Thus, CSME 310 can engage low speed mode 322 to communicate with interface 350 via low speed mode 354 until the high speed communication can be trained. In one embodiment, prior to or instead of sending boot up commands or information to storage device 340 via low speed mode 322, 352, CMSE 310 engages training over interface 320 to interface 350. After training the interface with settings for system 300, CSME 310 can engage or resume high speed mode 324, 354 to continue boot up operation. In one embodiment, CSME 310 only provisions firmware from an external firmware source to storage device 340 via high speed mode 324, 354.

In one embodiment, CSME 310 and storage device 340 provide security for exchanges over interface 320 and 350. It will be understood that to perform security over an interface, both devices coupled to the interface include components to support the security being implemented. Thus, CMSE 310 can include security engine 312, security key 314, and random number generator 316, while storage device 340 can include corresponding security engine 342, security key 344, and random number generator 346. For purposes of simplicity, the discussion of security operations is made with reference to CSME 310 and its security components and interface, and can be understood to apply to storage device 340 and its security components and interface.

Security engine 312 represents logic that enables CSME 310 to apply security for communication via interface 320. In one embodiment, security engine 312 is implemented in ROM code for CSME 310. In one embodiment, security engine 312 includes elements executed from firmware for CSME 310, and thus is not applied until CSME 310 executes valid firmware. For example, CSME 310 can apply an exponent based security procedure for communication over interface 320 prior to loading firmware, and can then apply a shared-key security procedure for communication over interface 320 after loading firmware. In one embodiment, ROM code can be configured to generate a shared key from an exponent based security procedure.

As will be understood by those skilled in the art, a common exponent based security procedure is a Diffie-Helman implementation, in which both CSME 310 and storage device 340 include (either in ROM, or fused in a fixed location) a base value (referred to as 'G'). The separate devices then generate separate exponents with random number generators (316 and 346), which exponents are referred to as 'a' and 'b.' CSME 310 can then generate a request signed by G^a, and storage device 340 can generate a response signed by GAb. The devices can then perform a handshake procedure, which establishes a session encryption key on the interface. After establishing the session encryption key, CSME 310 and storage device 340 can then exchange a shared key or root key over the interface in an encrypted exchange using session encryption key to exchange the encrypted root key. It is assumed that the process to generate shared security key 314, 344 is well known. Security engines 312 and 342 perform the operations of generating keys (both asymmetric and/or symmetric) and other security exchange operations.

It will be understood that shared keys or root keys can be obtained through possession attack (where an attacker has access to the hardware and the interface). Such an attack can be referred to as a "replay attack," where an attacker attempts to replay exchanges previously transmitted over the interface to attempt to bypass the security. In one embodiment, CSME 310 can protect system 300 from a replay attack by monitoring the generation and use of shared security keys 314. In one embodiment, CSME 310 includes on chip fuses 318 to monitor key usage. For example, security engine 312 can blow or set a fuse or fuse pattern for each shared key generated. Thus, CSME 310 via security engine 312 can guarantee that only one key is valid at a time. If an attacker attempts to sign a message with a previous key, CSME 310 can detect that it is not the current valid key, and prevent the attack. Typically, using a single fuse per key would be sufficient, but those skilled in the art will understand that more complex fuse patterns could be understood.

Those skilled in the art will recognize HMAC (hashed message authentication code) as a known shared encryption key security procedure. With HMAC, a sending device signs messages with a shared key and transmits the signed/authenticated messages. The receiving device receives the signed message and decodes it with the shared key. If the message does not properly authenticate with the shared key, the receiving device does not perform the operation or command requested. If the message authenticates, the receiving device executes the requested operation or command. In one embodiment, system 300 employs a secure hash algorithm (SHA) such as HMAC-SHA-256 as a security/signature protocol. Thus, the root key (stored in security key 314) can remain secret across interface 320, 350.

In one embodiment, security engine 312 supports authenticated commands to provision and keep secret a shared key. For example, as mentioned above, exponent based security can be engaged to generate a shared key. The authenticated commands can include, but are not necessarily limited to an authenticated root key write, and an authenticated shared key update. In one embodiment, CSME 310 maintains a replay protected monotonic counter (RPMC) (e.g., via security engine 312). In an embodiment where an RPMC is included, additional commands can include an authenticated Counter Read, and an authenticated Counter Increment.

Storage device 340 includes firmware 370. Firmware 370 includes firmware for the hardware components of the hardware platform, such as CSME 310, storage device 340, and a host processor (not specifically shown). CSME 310 provisions firmware 370 onto storage device 340 from a source external to the hardware platform, via external interface driver 330. Firmware images 372-0 through 372-(N−1) include a primary firmware image for each device, and can include zero or more backup primary images for any one or more components. It is not necessary that all components have the same number of firmware images stored on storage device 340. A common implementation would be to store a primary and secondary firmware image for each hardware component of the hardware platform.

Figure 4:
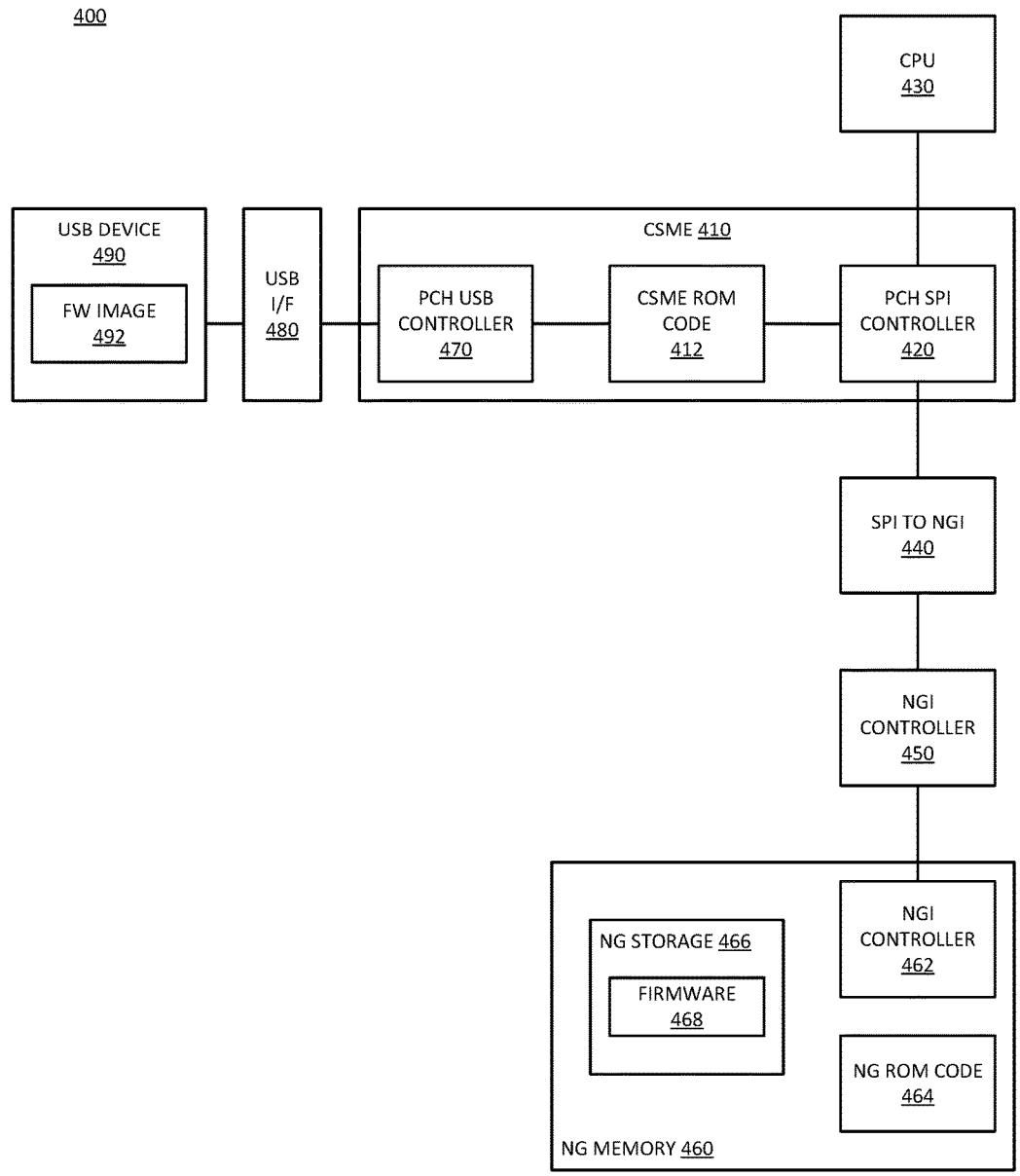
FIG. 4 is a block diagram of an embodiment of a system in which firmware can be provisioned from a USB device.

FIG. 4 is a block diagram of an embodiment of a system in which firmware can be provisioned from a USB device. System 400 represents elements of a hardware platform, and can be an example of elements of system 200 of Figure or system 100 of FIG. 1. The hardware platform of system 400 includes a hardware platform controller represented by CSME 410, a host processor represented by CPU 430, a nonvolatile storage device represented by NG (next generation) memory 460, and an external hardware interface represented by USB interface 480. USB interface 480 connects to USB device 490, which represents an external firmware source. In one embodiment, the hardware platform includes controller elements that interface commands from CPU 430 to NG memory 460, which would traditionally be routed to a flash device that stores firmware. The controller elements can include a command converter represented by SPI to NGI 440 and NGI controller 450.

CSME 410 includes ROM code 412 which begins operation when CSME 410 initiates operation. CSME 410 initiates operation on a "lifecycle event," which can include manufacturing of system 400, as well as recovery from corruption, initialization of system 400 related to a firmware update, initialization of system 400 related to an upgrade of NG memory 460, or other power cycling events of the platform controller. When CSME ROM code 412 initiates, it seeks for firmware associated with CSME 410. In one embodiment, CSME 410 can be configured to directly access a next generation memory device. In one embodiment, as shown, a hardware platform can be modified with elements that will allow traditional paths to be rerouted to NG memory 460.

In one embodiment, CSME 410 includes a controller that controls SPI (serial peripheral interface) communications on a hardware platform, shown as PCH (peripheral controller hub) SPI controller 420. It will be understood that SPI is a master-slave interface protocol that enables the interconnection of devices or chips that share a hardware platform. The slave devices are typically the "peripheral" devices to the host controller or host SOC of system 400. Thus, CSME 410 can initiate access to a location indicated in CSME ROM code 412 for firmware. CSME 410 does not initially have firmware, and in certain lifecycle events NG memory 460 will also not have valid firmware stored.

In one embodiment, SPI controller 420, rather than accessing an external SPI flash that would store firmware, decodes the access operations into instructions for NG memory 460, via SPI to NGI (next generation interface) 440. NGI represents an interface to a next generation memory device, which is expected to be different than a traditional storage device, as well as being different from a traditional SPI device, or device connected to SPI controller 420. SPI to NGI 440 converts commands and requests sent via a SPI protocol into commands and requests understood by NG memory 460. NGI controller 450 represents hardware and/or logic to control the hardware interface (e.g., drive pins for transmit and sample pins for receive). NGI controller 462 represents a controller or control logic within NG memory 460 to complete the interface from CSME 410.

NG memory 460 includes ROM code 464, which represents code the memory device will execute when powered up or power cycled (whether hard power cycling by discontinuing a power source to the device, or soft power cycling by placing the device in a low power, sleep, or suspended state). NG ROM code 464 looks for a firmware image stored locally on the storage device. NG ROM code 464 includes logic necessary to engage in communication with CSME 410 to provision firmware 468. Firmware 468 is stored in the next generation storage technology 466 of NG memory 460. It will be understood that NG memory 460 is also to store a host operating system and applications for system 400. Firmware 468 can be provisioned in-system in NG memory 460. The host operating system and applications can also be provisioned in-system to NG memory 460.

In one embodiment, CSME 410 determines whether it stores training data (e.g., timing parameters or other parameters or settings) for NGI controller 450 to use when sending requests to NG memory 460. If there is no training data, CSME 410 can use a low speed interface mode to send a firmware request to NG memory 460. If there is training data available, CSME 410 can use a high speed interface mode to send the requests. In one embodiment, when NG memory 460 does not store a functional or valid firmware image requested by CSME 410, NG memory 460 rejects the request. CSME 410 (via CSME ROM code 412) receives the rejection from NG memory 460 and then requests the firmware from an external source. Thus, CSME ROM code 412 can be configured to first check for firmware on NG memory 460, and then to check an external interface for firmware if valid firmware is not found. In one embodiment, CSME 410 and NG memory 460 can train the interface in low speed mode to enable use of a high speed mode to provision firmware.

To access the external interface, CSME ROM code 412 can access PCH USB controller 470 or another interface controller (not shown) to access an appropriate hardware interface. The hardware interface in system 400 is USB interface 480, which connects to USB device 490, which in turn stores firmware image 492. In one embodiment, CSME 410 accesses USB device 490 via a master-slave configuration (similar to an SPI protocol), where USB device 490 is the master and CSME 410 is the slave. In such a configuration, CSME 410 can act as a storage receiver for USB device 490, with CSME 410 passing the firmware image through to NG memory 460.

Thus, CSME ROM code 412 can read firmware image 492 from USB device 490 and write the data to SPI controller 420. SPI controller 420 can then forward the data to SPI to NGI decoder 440, and through NGI controller 450 to NGI controller 462 of NG memory 460. Ultimately, NG ROM code 464 writes the image as firmware 468 in NG storage 466. It will be understood that the reading and writing of firmware image 492 to firmware 468 will typically occur via multiple read and write operations that will be repeated until the complete image is written to NG memory 460.

In one embodiment, after provisioning the firmware to NG memory 460, CSME ROM code 412 will repeat execution of a routine to seek for firmware from NG memory 460. Thus, CSME 410 will generate a request via SPI controller 420, across SPI to NGI 430 and NGI controller 450. In one embodiment, CSME ROM code 412 initiates each firmware request in a low speed mode, and engages a training sequence to enable a high speed mode. When CSME ROM code 412 requests firmware after the firmware has been provisioned, NG memory 460 satisfies the request resulting in a successful boot operation. In the event of corruption of firmware 468, in one embodiment, appropriate ROM code (e.g., CSME ROM code 412 in the case of corruption to firmware for CSME 410, or NG ROM code 464 in the case of corruption to firmware for NG memory 460) can request a secondary image of the firmware. If there is no valid firmware, CSME 410 again provisions firmware image 492 from the external source.

In one embodiment, the NGI interface (SPI controller 420, to SPI to NGI 440, to NGI controller 450, to NGI controller 462) supports conversion of standard SPI interface functionality. Thus, standard SPI Read, Write, and Erase operations can be mapped to comparable operations for NG memory 460. Additionally, in one embodiment, system 400 supports RPMCs. If RPMCs are supported, the NGI interface can map RPMC functionality to unique I/O (input/output) pass through commands. Such pass through commands allow the use RPMC commands, which can be decoded by NG ROM code 464. In one embodiment, NGI controller 450 supports termination of SPI commands initiated by CPU 430, which can include standard mode commands, SMM (system management mode) commands, and commands from execution engines of CMSE 410.

Figure 5:
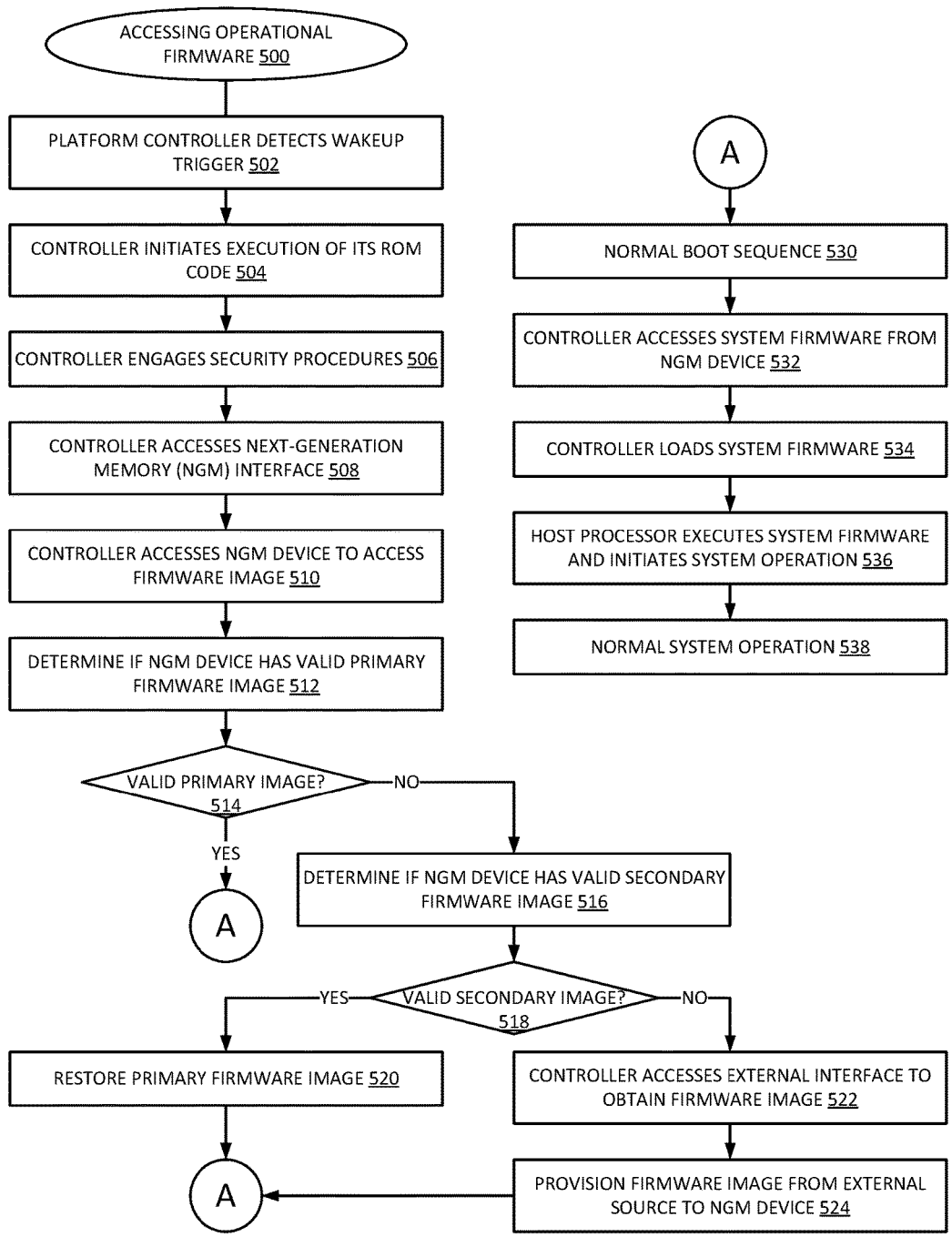
FIG. 5 is a flow diagram of an embodiment of a process for accessing operating firmware in a system that can provision firmware in-system.

FIG. 5 is a flow diagram of an embodiment of process 500 for accessing operating firmware in a system that can provision firmware in-system. In one embodiment, a platform controller (e.g., a manageability engine or converged security and manageability engine) detects a wake-up trigger, 502. The wake-up trigger initiates execution of the controller, and can be soft restart (e.g., an interrupt to wake the device from a low power state) or a hard restart (e.g., powering up the device). The controller initiates execution of its ROM code in response to the wake-up trigger, 504. The ROM code executes basic initial operations to start operation of the controller. One operation that the ROM code controls is to access firmware that provides the runtime execution logic for the controller. In one embodiment, the controller also initiates a host processor, and can access a firmware image for the host processor in addition to itself. In one embodiment, the host processor acts as the platform controller.

In one embodiment, the controller engages security procedures to protect an interface from the controller to the nonvolatile storage device where the firmware image should be stored, 506. The controller can engage an exponent based security procedure, a shared key security procedure, or another security procedure. The controller accesses the NGM interface, 508, and accesses the NGM device via the interface to obtain firmware, 510. In response to a request for firmware from the controller, the NGM device can determine if it has valid firmware. In one embodiment, making a determination about whether there is valid firmware includes the NGM device determining if there is a valid primary firmware image, 512. It will be understood that the controller can access its firmware and the firmware for a host processor. The NGM can access its firmware and indicate to the controller if it cannot find a valid firmware image.

If the NGM device determines there is a valid firmware image, 514 YES branch, it engages in a normal boot sequence, 530. In one embodiment, if the NGM device determines that there is not a valid firmware image, 514 NO branch, it can determine if there is a valid secondary or backup firmware image, 516. If there is a valid secondary image, 518 YES branch, the NGM device can deliver the firmware image to the controller and restore the primary firmware image from the backup image, 520. The controller then executes the normal boot sequence, 530. If the NGM device does not have a valid secondary image, 518 NO branch, the NGM device indicates there is no valid firmware to the controller, and the controller accesses an external interface to obtain a firmware image, 522. The controller then provisions the firmware image in-system from a source connected to the external interface to the NGM device, 524. After the firmware is provisioned, the controller can then request the firmware from the NGM device, which will provide the firmware to the controller. Then controller can then initiate the normal boot sequence, 530.

In the normal boot sequence, the controller accesses the firmware from the NGM device, 532, and loads the firmware for execution. Part of loading the firmware can include loading system firmware for the host processor to initialize the system, 534. The host processor executes the system firmware and initiates system operation, 536. Part of initiating the system includes accessing the host operating system from the NGM device and loading it on the system. The system can then proceed with normal operation, 538.

Figure 6A:
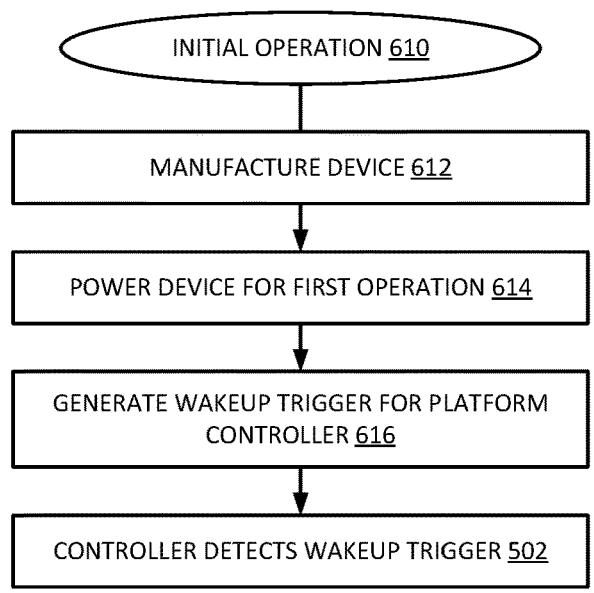
FIG. 6A is a flow diagram of an embodiment of a process for provisioning firmware for initial operation of a computing system.

FIG. 6A is a flow diagram of an embodiment of process 610 for provisioning firmware for initial operation of a computing system. Initial operation of a computing system can be one example of a lifecycle event for firmware on the hardware platform for which the platform controller will provision new firmware. A manufacturer manufactures a device that includes a hardware platform with a host processor and/or a platform controller, a NGM device, and an external hardware interface that can be accessed to provision a firmware image, 612. In one embodiment, the initial system is bare metal, and will thus need to provision firmware prior to being able to boot. The manufacturer provides an external firmware source at the external interface (e.g., plugs a source into a USB port or other hardware interface) and powers the device for the first operation, 614. The system powers up the platform controller which operates as a wake up trigger, and/or generates a wake up trigger for the platform controller, 616. The controller detects the wake up trigger and initiates operation, 502 (from process 500).

Figure 6B:
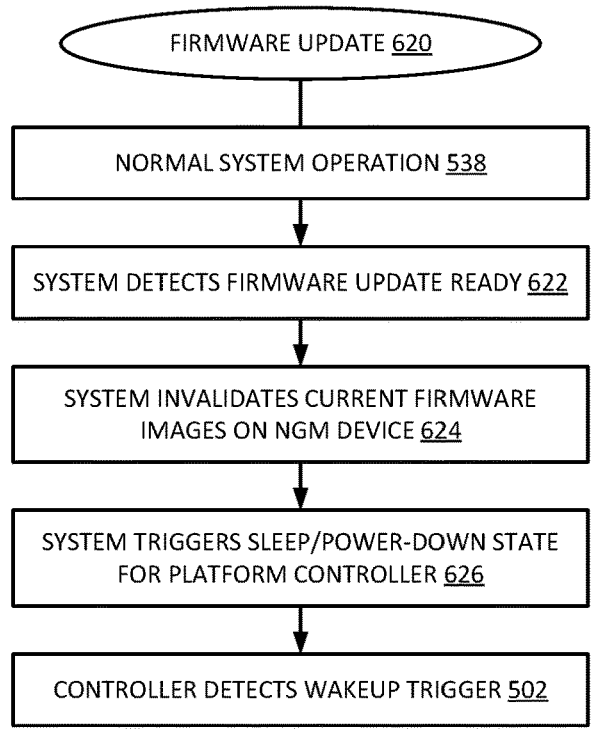
FIG. 6B is a flow diagram of an embodiment of a process for provisioning firmware in conjunction with a firmware update.

FIG. 6B is a flow diagram of an embodiment of process 620 for provisioning firmware in conjunction with a firmware update. Firmware updates can be one example of a lifecycle event for firmware on the hardware platform for which the platform controller will provision new firmware. It is assumed that the system is operating normally, 538 (from process 500), when the system detects that a firmware update is ready, 622. It will be understood that a firmware update can also be provided in the event of system recovery, which is addressed in process 630 of FIG. 6C. In one embodiment, an external firmware source indicates the firmware to the platform controller. The controller or other logic (e.g., a controller on the NGM device for memory device firmware updates) can invalidate the current firmware image or images (in the case of backups) on the NGM device, 624. In one embodiment, after invalidating the current firmware images, the system can then be triggered to restart, which will cause it to encounter a situation in which there is no valid firmware on the hardware platform, and so the controller will seek firmware from an external source. Thus, the system can trigger a sleep or power-down state for the controller, 626. The system can also generate a wake up event for the controller, 502 (from process 500), which will cause the controller to seek for firmware and provision the firmware when no valid firmware is found.

Figure 6C:
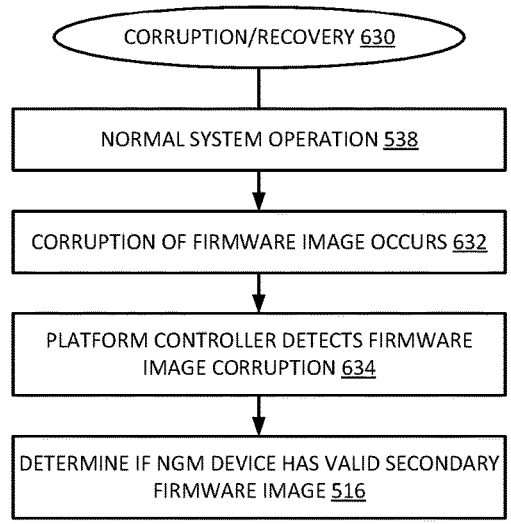
FIG. 6C is a flow diagram of an embodiment of a process for provisioning firmware for recovery from an error.

FIG. 6C is a flow diagram of an embodiment of process 630 for provisioning firmware for recovery from an error. Recovery from error or corruption can be one example of a lifecycle event for firmware on the hardware platform for which the platform controller will provision new firmware. It can be assumed that at some point in time the system operates normally, 538 (from process 500), prior to a corruption event. Any of a number of computer failures or attacks can occur that compromise the firmware image, 632. It will be understood that when the firmware image is illegally modified (e.g., not performed with valid authentication), the firmware image will no longer be considered valid. The controller can detect that the firmware image is corrupted, 634, and invalidate the firmware image. In one embodiment, the system implements secondary firmware images, also stored on the NGM device. When secondary firmware images are used, the controller can request the NGM device to determine if there is a valid secondary image, 516 (from process 500). Alternatively, if the system does not implement backup firmware images, similar to a firmware update event the system can be triggered to restart, which will cause it to encounter a situation in which there is no valid firmware on the hardware platform. Thus, the controller will seek firmware from an external source, and the system generate a wake up event for the controller, 502 (from process 500), which will cause the controller to seek for firmware and provision the firmware when no valid firmware is found.

Figure 6D:
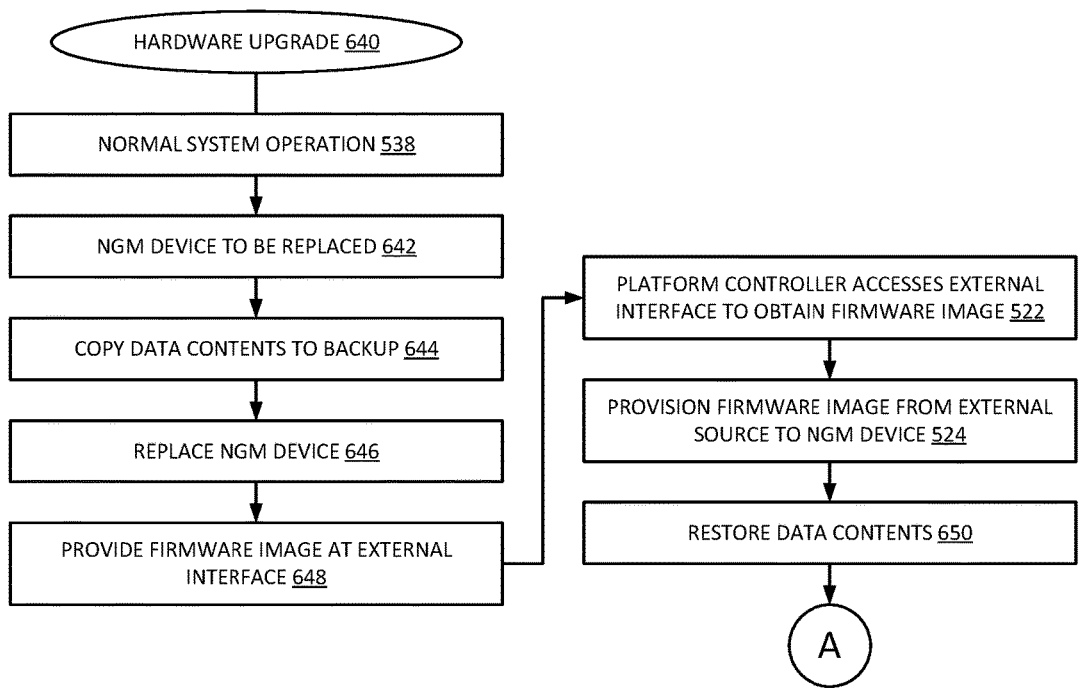
FIG. 6D is a flow diagram of an embodiment of a process for provisioning firmware in conjunction with a hardware upgrade of the device that stores system firmware.

FIG. 6D is a flow diagram of an embodiment of process 640 for provisioning firmware in conjunction with a hardware upgrade of the device that stores system firmware. A hardware upgrade can be one example of a lifecycle event for firmware on the hardware platform for which the platform controller will provision new firmware. The system can be assumed to be operating normally prior to a hardware upgrade, 538 (from process 500). The user or computing system administrator determines to replace the NGM device, 642. The NGM device stores the firmware images for the hardware platform. In one embodiment, the replacement NGM device can be successfully preloaded with the contents of the previous storage device, in which case the firmware can be successfully transferred. In one embodiment, an installation process for the replacement NGM device can corrupt data preloaded onto the replacement NGM device. Alternatively, it could be inconvenient or difficult to preload the replacement NGM device with data stored on the current NGM device. Thus, data will be provisioned to the replacement NGM device from an external location, which will include firmware images.

To enable such a replacement, the administrator copies the data contents to a backup location, 644, off the hardware platform or in a different storage device that will not provide the firmware images for execution. The administrator replaces the NGM device, 646, and provides a firmware image at an external interface of the hardware platform, 648. The source can be the location of the backup copy of the data contents. In one embodiment, the controller accesses the external interface to obtain the firmware image, 522, and provisions the firmware image from the external source to the (replacement) NGM device, 524 (from process 500). The system can then restore the data contents from the previous NGM device to the replacement NGM device and execute normal operation, 650.

Figure 7:
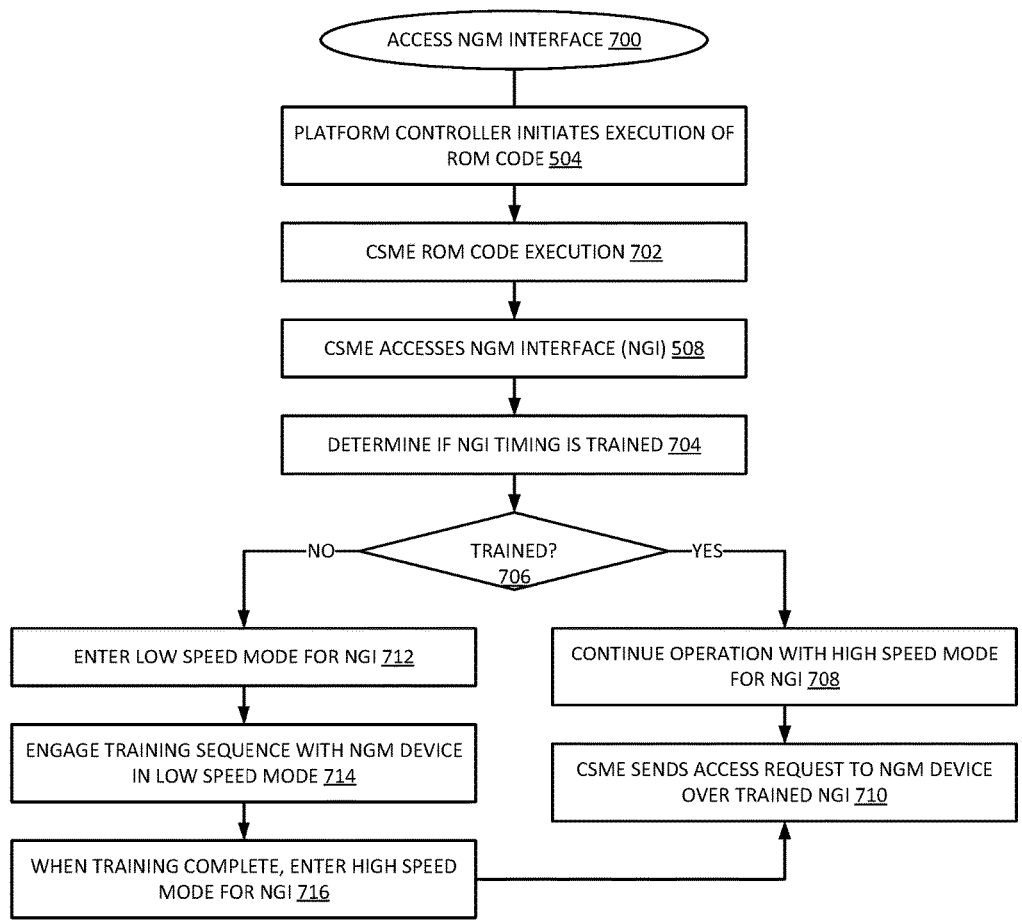
FIG. 7 is a flow diagram of an embodiment of a process for accessing a next-generation memory device interface from a manageability engine.

FIG. 7 is a flow diagram of an embodiment of process 700 for accessing a next-generation memory device interface from a platform controller or manageability engine. In one embodiment, the platform controller initiates execution of its ROM code, 504 (from process 500). The controller ROM code executes, 702, which can cause the controller to access the NGM interface (NGI), 508. For purposes herein, the primary purpose for which the controller would access the NGI is to access and/or to provision firmware. In one embodiment, the controller ROM code determines if it has training data for the NGI, 704. If the interface is trained, 706 YES branch, the controller continues the access operation at high speed mode for the interface, 708. The controller can send access requests and receive responses over the trained NGI in high speed mode, 710.

If the NGI is not trained, 706 NO branch, the controller ROM code can enter a low speed mode for the NGI, 712. In one embodiment, the controller ROM code initiates a training sequence in low speed mode, 714. Once the training sequence successfully completes, the controller ROM code can then engage a high speed mode for the NGI, 716. After entering the high speed mode, the controller and NGM device can communicate over the NGI at high speed mode, 710.

Figure 8:
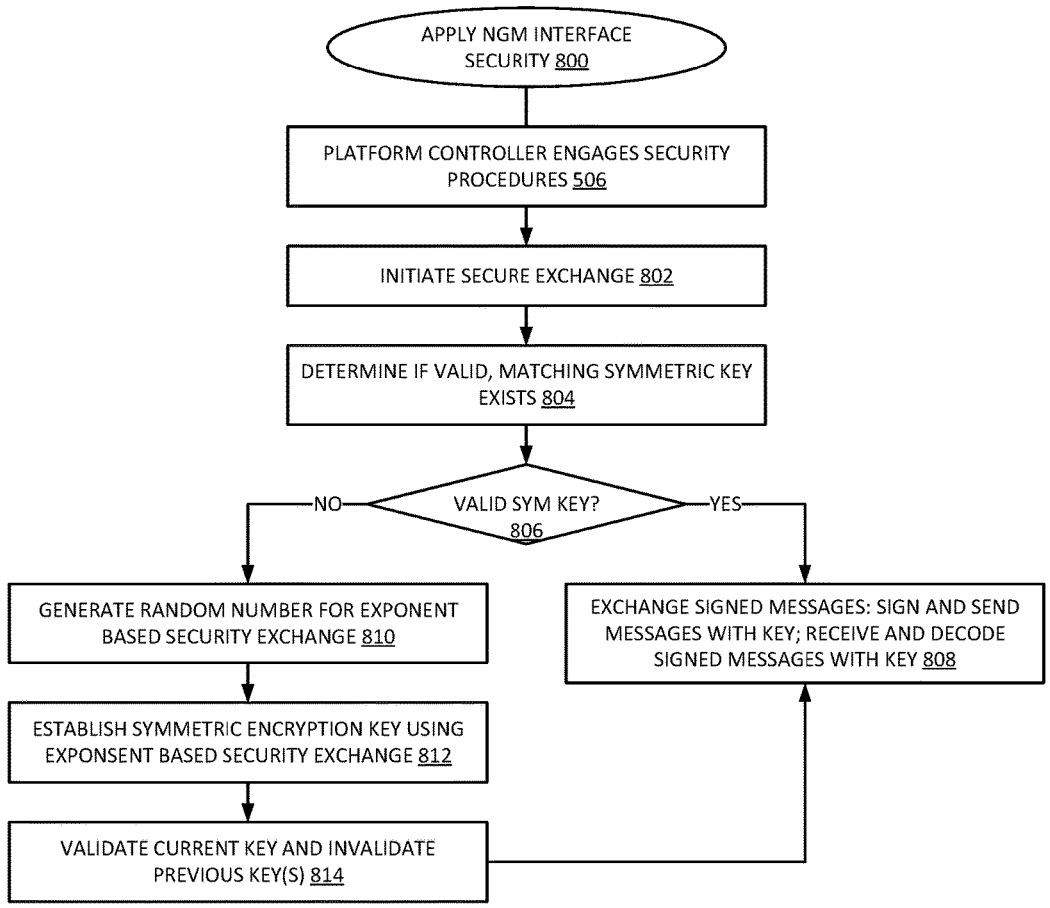
FIG. 8 is a flow diagram of an embodiment of a process for applying security to an exchange over a next-generation memory device interface.

FIG. 8 is a flow diagram of an embodiment of process 800 for applying security to an exchange over a next-generation memory device interface. In one embodiment, the platform controller engages security procedures to secure the NGI in conjunction with obtaining and/or provisioning a firmware image from the NGM device, 506. The controller can initiate a secure exchange, 802. In one embodiment, the secure exchange used will depend on whether the controller and NGM device have established a shared key exchange. Thus, the controller can determine if there is a valid, matching symmetric or shared key, 804. If there is a shared key, 806 YES branch, the controller and the NGM device exchange signed messages using the key, 808. The sending device signs the messages with the key and sends them to the receiving device. The receiving device receives the encrypted messages and decodes them with the key.

In one embodiment, if there is not a shared key, 808 NO branch, the controller can engage an exponent based security procedure (e.g., Diffie-Helman). Thus, the controller can generate a random number exponent for the exponent based security exchange, 810. The controller and the NGM device can then establish a symmetric encryption key using the exponent based security procedure, 812. In one embodiment, the controller manages and monitors the use of all shared keys. For example, the controller can have fuses associated with the use of shared keys, and set a fuse pattern or set a fuse in response to creating a key. The key can then be associated with the fuse pattern, and will only be valid when a key is matched with an expected fuse pattern. The controller and NGM device validate the current key and can also invalidate previous keys, 814. In one embodiment, the validation and invalidation occurs through the use of the on chip fuses or other tracking/monitoring mechanism employed by the controller.

Figure 9:
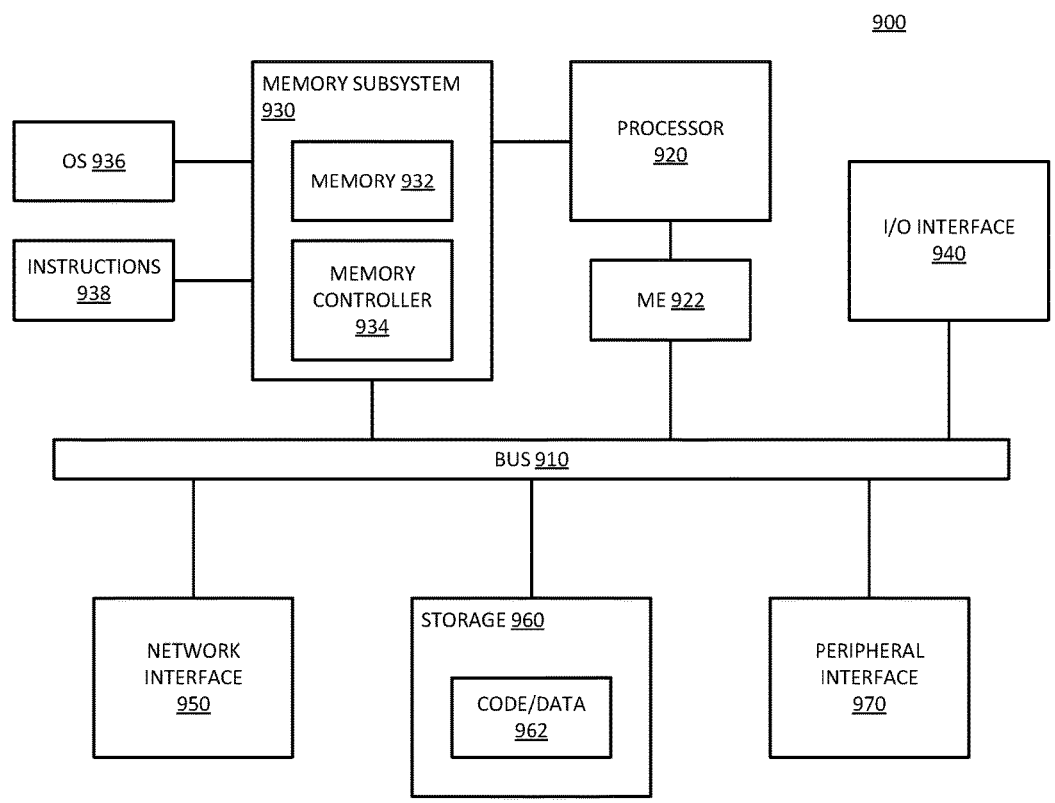
FIG. 9 is a block diagram of an embodiment of a computing system in which in-system firmware provisioning can be implemented.

FIG. 9 is a block diagram of an embodiment of a computing system in which in-system firmware provisioning can be implemented. System 900 represents a computing device in accordance with any embodiment described herein, and can be a laptop computer, a desktop computer, a server, a gaming or entertainment control system, a scanner, copier, printer, routing or switching device, or other electronic device. System 900 includes processor 920, which provides processing, operation management, and execution of instructions for system 900. Processor 920 can include any type of microprocessor, central processing unit (CPU), processing core, or other processing hardware to provide processing for system 900. Processor 920 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 930 represents the main memory of system 900, and provides temporary storage for code to be executed by processor 920, or data values to be used in executing a routine. Memory subsystem 930 can include one or more memory devices such as read-only memory (ROM), flash memory, one or more varieties of random access memory (RAM), or other memory devices, or a combination of such devices. Memory subsystem 930 stores and hosts, among other things, operating system (OS) 936 to provide a software platform for execution of instructions in system 900. Additionally, other instructions 938 are stored and executed from memory subsystem 930 to provide the logic and the processing of system 900. OS 936 and instructions 938 are executed by processor 920. Memory subsystem 930 includes memory device 932 where it stores data, instructions, programs, or other items. In one embodiment, memory subsystem includes memory controller 934, which is a memory controller to generate and issue commands to memory device 932. It will be understood that memory controller 934 could be a physical part of processor 920.

Processor 920 and memory subsystem 930 are coupled to bus/bus system 910. Bus 910 is an abstraction that represents any one or more separate physical buses, communication lines/interfaces, and/or point-to-point connections, connected by appropriate bridges, adapters, and/or controllers. Therefore, bus 910 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 910 can also correspond to interfaces in network interface 950.

System 900 also includes one or more input/output (I/O) interface(s) 940, network interface 950, one or more internal mass storage device(s) 960, and peripheral interface 970 coupled to bus 910. I/O interface 940 can include one or more interface components through which a user interacts with system 900 (e.g., video, audio, and/or alphanumeric interfacing). Network interface 950 provides system 900 the ability to communicate with remote devices (e.g., servers, other computing devices) over one or more networks. Network interface 950 can include an Ethernet adapter, wireless interconnection components, USB (universal serial bus), or other wired or wireless standards-based or proprietary interfaces.

Peripheral interface 970 can include any hardware interface not specifically mentioned above. Peripherals refer generally to devices that connect dependently to system 900. A dependent connection is one where system 900 provides the software and/or hardware platform on which operation executes, and with which a user interacts.

In one embodiment, storage 960 can be or include any conventional medium for storing large amounts of data in a nonvolatile manner, such as one or more magnetic, solid state, or optical based disks, or a combination. Storage 960 can also include next generation memory technology as described above. Storage 960 holds code or instructions and data 962 in a persistent state (i.e., the value is retained despite interruption of power to system 900). Storage 960 also stores firmware images for use by manageability engine (ME) 922 or another platform controller. Storage 960 can be generically considered to be a "memory," although memory 930 is the executing or operating memory to provide instructions to processor 920. Whereas storage 960 is nonvolatile, memory 930 can include volatile memory (i.e., the value or state of the data is indeterminate if power is interrupted to system 900).

ME 922 can provision firmware from an external interface (such as network interface 950 or peripheral interface 970) to storage 960. ME 922 will generally provision the firmware in response to a firmware lifecycle event, where there is not a valid primary firmware image stored on storage 960.

Figure 10:
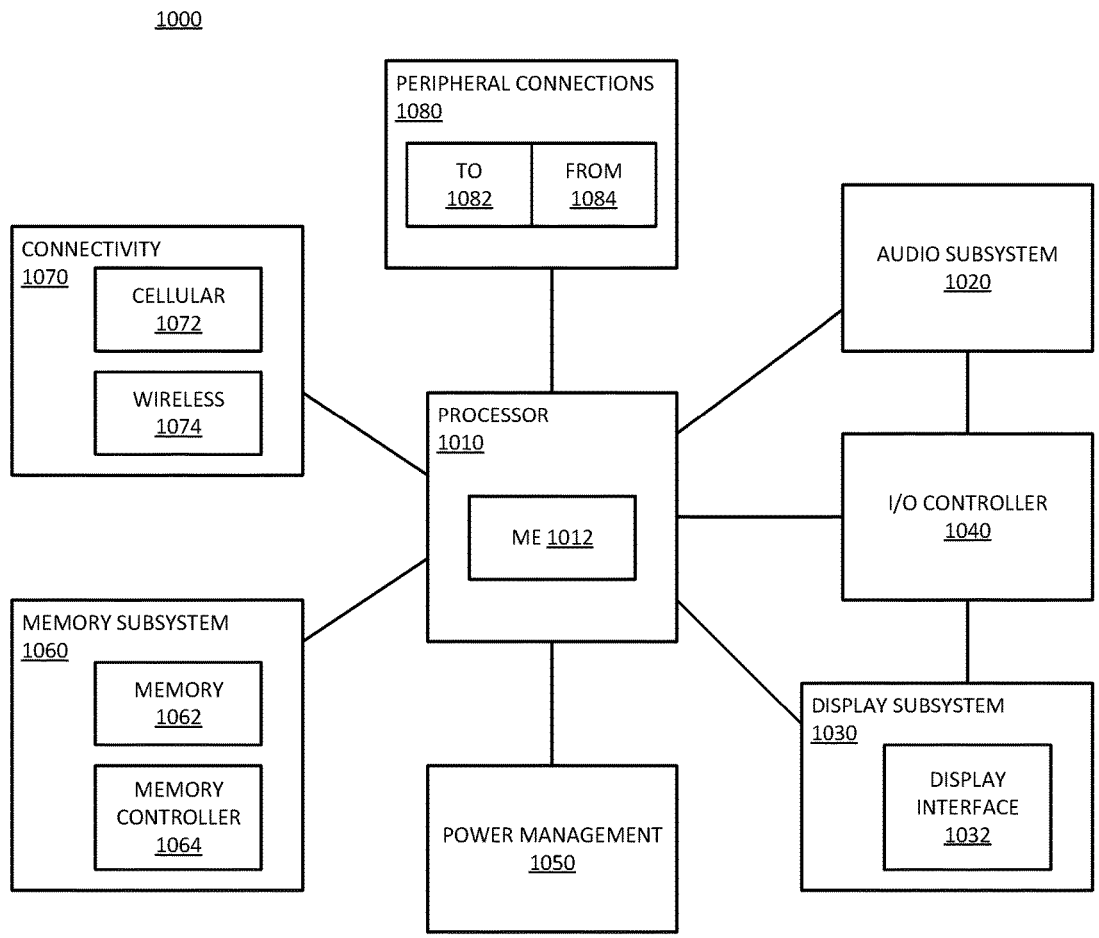
FIG. 10 is a block diagram of an embodiment of a mobile device in which in-system firmware provisioning can be implemented.

FIG. 10 is a block diagram of an embodiment of a mobile device in which in-system firmware provisioning can be implemented. Device 1000 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 1000.

Device 1000 includes processor 1010, which performs the primary processing operations of device 1000. Processor 1010 can include one or more physical devices, such as microprocessors, application processors, microcontrollers, programmable logic devices, or other processing means. The processing operations performed by processor 1010 include the execution of an operating platform or operating system on which applications and/or device functions are executed. The processing operations include operations related to I/O (input/output) with a human user or with other devices, operations related to power management, and/or operations related to connecting device 1000 to another device. The processing operations can also include operations related to audio I/O and/or display I/O.

In one embodiment, device 1000 includes audio subsystem 1020, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1000, or connected to device 1000. In one embodiment, a user interacts with device 1000 by providing audio commands that are received and processed by processor 1010.

Display subsystem 1030 represents hardware (e.g., display devices) and software (e.g., drivers) components that provide a visual and/or tactile display for a user to interact with the computing device. Display subsystem 1030 includes display interface 1032, which includes the particular screen or hardware device used to provide a display to a user. In one embodiment, display interface 1032 includes logic separate from processor 1010 to perform at least some processing related to the display. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to device 1000 through which a user might interact with the system. For example, devices that can be attached to device 1000 might include microphone devices, speaker or stereo systems, video systems or other display device, keyboard or keypad devices, or other I/O devices for use with specific applications such as card readers or other devices.

As mentioned above, I/O controller 1040 can interact with audio subsystem 1020 and/or display subsystem 1030. For example, input through a microphone or other audio device can provide input or commands for one or more applications or functions of device 1000. Additionally, audio output can be provided instead of or in addition to display output. In another example, if display subsystem includes a touchscreen, the display device also acts as an input device, which can be at least partially managed by I/O controller 1040. There can also be additional buttons or switches on device 1000 to provide I/O functions managed by I/O controller 1040.

In one embodiment, I/O controller 1040 manages devices such as accelerometers, cameras, light sensors or other environmental sensors, gyroscopes, global positioning system (GPS), or other hardware that can be included in device 1000. The input can be part of direct user interaction, as well as providing environmental input to the system to influence its operations (such as filtering for noise, adjusting displays for brightness detection, applying a flash for a camera, or other features). In one embodiment, device 1000 includes power management 1050 that manages battery power usage, charging of the battery, and features related to power saving operation.

Memory subsystem 1060 includes memory device(s) 1062 for storing information in device 1000. Memory subsystem 1060 can include nonvolatile (state does not change if power to the memory device is interrupted) and/or volatile (state is indeterminate if power to the memory device is interrupted) memory devices. Memory 1060 can store application data, user data, music, photos, documents, or other data, as well as system data (whether long-term or temporary) related to the execution of the applications and functions of system 1000. In one embodiment, memory subsystem 1060 includes memory controller 1064 (which could also be considered part of the control of system 1000, and could potentially be considered part of processor 1010). Memory controller 1064 includes a scheduler to generate and issue commands to memory device 1062.

Connectivity 1070 includes hardware devices (e.g., wireless and/or wired connectors and communication hardware) and software components (e.g., drivers, protocol stacks) to enable device 1000 to communicate with external devices. The external device could be separate devices, such as other computing devices, wireless access points or base stations, as well as peripherals such as headsets, printers, or other devices.

Connectivity 1070 can include multiple different types of connectivity. To generalize, device 1000 is illustrated with cellular connectivity 1072 and wireless connectivity 1074. Cellular connectivity 1072 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1074 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 1080 include hardware interfaces and connectors, as well as software components (e.g., drivers, protocol stacks) to make peripheral connections. It will be understood that device 1000 could both be a peripheral device ("to" 1082) to other computing devices, as well as have peripheral devices ("from" 1084) connected to it. Device 1000 commonly has a "docking" connector to connect to other computing devices for purposes such as managing (e.g., downloading and/or uploading, changing, synchronizing) content on device 1000. Additionally, a docking connector can allow device 1000 to connect to certain peripherals that allow device 1000 to control content output, for example, to audiovisual or other systems.

In addition to a proprietary docking connector or other proprietary connection hardware, device 1000 can make peripheral connections 1080 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In addition to what is discussed above, memory subsystem 1060 can include next generation memory technology as described above. Memory subsystem 1060 stores firmware images in a nonvolatile state for use by manageability engine (ME) 1012 or another platform controller. ME 1012 can provision firmware from an external interface (such as connectivity 1070 or peripheral connections 1080) to nonvolatile storage in memory subsystem 1060. ME 1012 will generally provision the firmware in response to a firmware lifecycle event, where there is not a valid primary firmware image stored in memory subsystem 1060.

In one aspect, a method includes: in a hardware platform including a processor, a nonvolatile storage device, and an external interface to interface a device external to the hardware platform, determining that the hardware platform lacks functional firmware to boot the hardware platform; accessing firmware from a source via the external interface; provisioning the firmware to the storage device; and booting the hardware platform from the firmware provisioned to the storage device.

In one embodiment, the storage device comprises a byte-addressable memory device. In one embodiment, the hardware platform comprises a two level memory system, where the nonvolatile storage device is configured as main memory for the processor, and further including a volatile memory device configured as a cache for the nonvolatile storage device. In one embodiment, determining that the hardware platform lacks functional firmware comprises determining that the hardware platform lacks a valid primary firmware image and lacks a valid backup firmware image. In one embodiment, provisioning the firmware comprises provisioning the firmware for a firmware lifecycle event, including one of initial boot after manufacturing, field update to the firmware, nonvolatile storage device upgrade, or corruption recovery. In one embodiment, provisioning the firmware further comprises: detecting that timing parameters for an interface to the storage device are not trained; entering a low speed mode to train the timing parameters; and entering a high speed transfer mode to provision the firmware. In one embodiment, provisioning the firmware further comprises engaging security over an interface to the storage device. In one embodiment, engaging the security further comprises: employing an exponent-based security handshake procedure to establish a symmetric key. In one embodiment, engaging the security further comprises: exchanging encrypted messages with a symmetric key exchange. In one embodiment, engaging the security further comprises: monitoring symmetric key use to prevent replay attacks. In one embodiment, monitoring symmetric key use to prevent replay attacks further comprises: managing symmetric key use with associated fuses, wherein a symmetric key is only valid when associated with a predetermined fuse pattern.

In one aspect, a hardware platform for a computing device includes: a processor to execute operations; an external hardware interface to interface a device external to the hardware platform; a nonvolatile storage device coupled to the processor; and a controller device coupled to the processor, to the external hardware interface, and to the storage device, the controller device to determine that the hardware platform lacks functional firmware to boot the hardware platform, access firmware via the external interface, provision the firmware to the storage device, and initiate a boot sequence for the hardware platform from the firmware provisioned to the storage device.

In one embodiment, the storage device includes an interface that decodes memory access commands for operation by the storage device. In one embodiment, the storage device comprises a byte-addressable memory device. In one embodiment, the hardware platform further comprising a volatile memory device, wherein the hardware platform comprises a two level memory system, where the nonvolatile storage device is configured as main memory for the processor, and the volatile memory device is configured as a cache for the nonvolatile storage device. In one embodiment, the controller device comprises a manageability engine. In one embodiment, the controller device comprises a converged security and manageability engine. In one embodiment, the controller device is to access and provision firmware for the controller device. In one embodiment, the controller device is to access and provision firmware for the processor. In one embodiment, the controller device is to determine that the hardware platform lacks a valid primary firmware image and lacks a valid backup firmware image. In one embodiment, the controller device is to provision the firmware for a firmware lifecycle event, including one of initial boot after manufacturing, field update to the firmware, nonvolatile storage device upgrade, or corruption recovery. In one embodiment, the external hardware interface comprises a hardware interface compliant with one of a universal serial bus interface, a local area network interface, or a wide area network interface. In one embodiment, the controller is further to detect that timing parameters for an interface to the storage device are not trained; enter a low speed mode to train the timing parameters; and enter a high speed transfer mode to provision the firmware. In one embodiment, the controller is further to engage security over an interface to the storage device. In one embodiment, the controller further comprises: on-chip fuses associated with a symmetric key security protocol with the storage device, wherein the controller blows a fuse for each symmetric key generated. In one embodiment, the controller is to further employ an exponent-based security handshake procedure to establish a symmetric key. In one embodiment, the controller is to further exchange encrypted messages with a symmetric key exchange. In one embodiment, the controller is to further monitor symmetric key use to prevent replay attacks. In one embodiment, the controller is to further manage symmetric key use with associated fuses, wherein a symmetric key is only valid when associated with a predetermined fuse pattern.

In one aspect, an electronic device includes: a hardware platform for a computing device, including a processor to execute operations; an external hardware interface to interface a device external to the hardware platform; a nonvolatile storage device coupled to the processor; and a controller device coupled to the processor, to the external hardware interface, and to the storage device, the controller device to determine that the hardware platform lacks functional firmware to boot the hardware platform, access firmware via the external interface, provision the firmware to the storage device, and initiate a boot sequence for the hardware platform from the firmware provisioned to the storage device; and a synchronous dynamic random access memory (SDRAM) device coupled to the hardware platform to store operational data accessed from the nonvolatile storage device for execution by the processor.

In one embodiment, the storage device includes an interface that decodes memory access commands for operation by the storage device. In one embodiment, the storage device comprises a byte-addressable memory device. In one embodiment, the electronic device further comprising a volatile memory device, wherein the hardware platform comprises a two level memory system, where the nonvolatile storage device is configured as main memory for the processor, and the volatile memory device is configured as a cache for the nonvolatile storage device. In one embodiment, the controller device comprises a manageability engine. In one embodiment, the controller device comprises a converged security and manageability engine. In one embodiment, the controller device is to access and provision firmware for the controller device. In one embodiment, the controller device is to access and provision firmware for the processor. In one embodiment, the controller device is to determine that the hardware platform lacks a valid primary firmware image and lacks a valid backup firmware image. In one embodiment, the controller device is to provision the firmware for a firmware lifecycle event, including one of initial boot after manufacturing, field update to the firmware, nonvolatile storage device upgrade, or corruption recovery. In one embodiment, the external hardware interface comprises a hardware interface compliant with one of a universal serial bus interface, a local area network interface, or a wide area network interface. In one embodiment, the controller is further to detect that timing parameters for an interface to the storage device are not trained; enter a low speed mode to train the timing parameters; and enter a high speed transfer mode to provision the firmware. In one embodiment, the controller is further to engage security over an interface to the storage device. In one embodiment, the controller further comprises: on-chip fuses associated with a symmetric key security protocol with the storage device, wherein the controller blows a fuse for each symmetric key generated. In one embodiment, the controller is to further employ an exponent-based security handshake procedure to establish a symmetric key. In one embodiment, the controller is to further exchange encrypted messages with a symmetric key exchange. In one embodiment, the controller is to further monitor symmetric key use to prevent replay attacks. In one embodiment, the controller is to further manage symmetric key use with associated fuses, wherein a symmetric key is only valid when associated with a predetermined fuse pattern.

In one aspect, an article of manufacture comprising a computer readable storage medium having content stored thereon, which when executed performs operations including: in a hardware platform including a processor, a nonvolatile storage device, and an external interface to interface a device external to the hardware platform, determining that the hardware platform lacks functional firmware to boot the hardware platform; accessing firmware from a source via the external interface; provisioning the firmware to the storage device; and booting the hardware platform from the firmware provisioned to the storage device.

In one embodiment, the storage device comprises a byte-addressable memory device. In one embodiment, the hardware platform comprises a two level memory system, where the nonvolatile storage device is configured as main memory for the processor, and further including a volatile memory device configured as a cache for the nonvolatile storage device. In one embodiment, the content for determining that the hardware platform lacks functional firmware comprises content for determining that the hardware platform lacks a valid primary firmware image and lacks a valid backup firmware image. In one embodiment, the content for provisioning the firmware comprises content for provisioning the firmware for a firmware lifecycle event, including one of initial boot after manufacturing, field update to the firmware, nonvolatile storage device upgrade, or corruption recovery. In one embodiment, the content for provisioning the firmware further comprises content for detecting that timing parameters for an interface to the storage device are not trained; entering a low speed mode to train the timing parameters; and entering a high speed transfer mode to provision the firmware. In one embodiment, the content for provisioning the firmware further comprises content for engaging security over an interface to the storage device. In one embodiment, the content for engaging the security further comprises content for employing an exponent-based security handshake procedure to establish a symmetric key. In one embodiment, the content for engaging the security further comprises content for exchanging encrypted messages with a symmetric key exchange. In one embodiment, the content for engaging the security further comprises content for monitoring symmetric key use to prevent replay attacks. In one embodiment, the content for monitoring symmetric key use to prevent replay attacks further comprises content for managing symmetric key use with associated fuses, wherein a symmetric key is only valid when associated with a predetermined fuse pattern.

In one aspect, an apparatus includes: a hardware platform including a processor, a nonvolatile storage device, and an external interface to interface a device external to the hardware platform; means for determining that the hardware platform lacks functional firmware to boot the hardware platform; means for accessing firmware from a source via the external interface; means for provisioning the firmware to the storage device; and means for booting the hardware platform from the firmware provisioned to the storage device.

In one embodiment, the storage device comprises a byte-addressable memory device. In one embodiment, the hardware platform comprises a two level memory system, where the nonvolatile storage device is configured as main memory for the processor, and further including a volatile memory device configured as a cache for the nonvolatile storage device. In one embodiment, the means for determining that the hardware platform lacks functional firmware comprises means for determining that the hardware platform lacks a valid primary firmware image and lacks a valid backup firmware image. In one embodiment, the means for provisioning the firmware comprises means for provisioning the firmware for a firmware lifecycle event, including one of initial boot after manufacturing, field update to the firmware, nonvolatile storage device upgrade, or corruption recovery. In one embodiment, the means for provisioning the firmware further comprises means for detecting that timing parameters for an interface to the storage device are not trained; entering a low speed mode to train the timing parameters; and entering a high speed transfer mode to provision the firmware. In one embodiment, the means for provisioning the firmware further comprises means for engaging security over an interface to the storage device. In one embodiment, the means for engaging the security further comprises means for employing an exponent-based security handshake procedure to establish a symmetric key. In one embodiment, the means for engaging the security further comprises means for exchanging encrypted messages with a symmetric key exchange. In one embodiment, the means for engaging the security further comprises means for monitoring symmetric key use to prevent replay attacks. In one embodiment, the means for monitoring symmetric key use to prevent replay attacks further comprises means for managing symmetric key use with associated fuses, wherein a symmetric key is only valid when associated with a predetermined fuse pattern.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A hardware platform comprising:
   a processor;
   a nonvolatile storage device coupled with the processor and mounted on the hardware platform; and
   hardware logic to:
      determine whether functional firmware to boot the hardware platform is stored on the nonvolatile storage device;
      in response to a determination that the nonvolatile storage device lacks functional firmware, access firmware from a source via an external hardware interface;
      train an interface to the nonvolatile storage device in a low speed mode;
      transfer the firmware to the nonvolatile storage device in a high speed mode;
      store the firmware on the nonvolatile storage device via memory access commands; and
      initiate a boot sequence for the hardware platform from the firmware stored on the nonvolatile storage device.

2. The hardware platform of claim 1, wherein:
   the nonvolatile storage device comprises a byte addressable nonvolatile storage device.

3. The hardware platform of claim 1, wherein the nonvolatile storage device comprises at least one of three dimensional (3D) cross point memory, phase change memory, resistive memory, nanowire memory, ferroelectric transistor random access memory (FeTRAM), magnetoresistive random access memory (MRAM), and spin transfer torque (STT)-MRAM.

4. The hardware platform of claim 1, wherein the hardware logic is to:
   store the firmware on the nonvolatile storage device as a first firmware image;
   store a second copy of the firmware on the nonvolatile storage device as a secondary firmware image; and
   in response to a determination that the first firmware image is invalid, initiate the boot sequence for the platform from the secondary firmware image.

5. The hardware platform of claim 1, wherein the nonvolatile storage device is to store the firmware for the platform and to operate as system memory for the platform.

6. The hardware platform of claim 1, wherein the hardware platform comprises a two-level memory (2LM) system, and the nonvolatile storage device comprises a second level memory device in the 2LM.

7. The hardware platform of claim 1, wherein the nonvolatile storage device comprises far memory, and a second storage device comprises near memory.

8. The hardware platform of claim 7, wherein the interface between the nonvolatile storage device and the processor comprises a far memory interface (FMI).

9. The hardware platform of claim 7, further comprising a volatile memory device as the near memory.

10. The hardware platform of claim 9, wherein the second storage device is to operate as a cache for the nonvolatile storage device.

11. The hardware platform of claim 1, wherein the hardware logic comprises a controller device, and wherein the controller device is to access the firmware for the controller device.

12. The hardware platform of claim 1, wherein the hardware logic is to access the firmware for the processor.

13. The hardware platform of claim 1, wherein the external hardware interface comprises a hardware interface compliant with one of a universal serial bus interface, a local area network interface, or a wide area network interface.

14. The hardware platform of claim 1, wherein the hardware logic is further to engage security over the interface to the nonvolatile storage device.

15. The hardware platform of claim 14, wherein the hardware logic further comprises:
on-chip fuses associated with a symmetric key security protocol with the nonvolatile storage device, wherein the hardware logic is to blow one of the on-chip fuses in response to generation of a symmetric key.

16. The hardware platform of claim 1, wherein the hardware logic is to further:
map serial peripheral interface (SPI) operations to the memory access commands to store and access the firmware on the nonvolatile storage device.

17. A method comprising:
determining whether functional firmware to boot a hardware platform is stored on a nonvolatile storage device, wherein the nonvolatile storage device is mounted on the hardware platform;
in response to determining the nonvolatile storage device lacks functional firmware, accessing firmware from a source via an external hardware interface;
training an interface to the nonvolatile storage device while in a low speed mode;
transferring the firmware to the nonvolatile storage device while in a high speed mode;
storing the firmware on the nonvolatile storage device via memory access commands; and
initiating a boot sequence for the hardware platform from the firmware stored on the nonvolatile storage device.

18. The method of claim 17, further comprising:
storing the firmware on the nonvolatile storage device as a first firmware image;
storing a second copy of the firmware on the nonvolatile storage device as a secondary firmware image; and
in response to determining that the first firmware image is invalid, initiating the boot sequence for the platform from the secondary firmware image.

19. The method of claim 17, wherein accessing the firmware comprises: accessing, by a controller device, the firmware for the controller device.

20. The method of claim 17, wherein accessing the firmware comprises: accessing, by a controller device, firmware for a processor coupled with the nonvolatile storage device.

21. The method of claim 17, wherein the hardware platform comprises a two-level memory (2LM) system, and the nonvolatile storage device comprises a second level memory device in the 2LM.

22. The method of claim 17, wherein the nonvolatile storage device comprises far memory, and a second memory device comprises near memory.

23. The method of claim 17, wherein the nonvolatile storage device comprises at least one of three dimensional (3D) cross point memory, phase change memory, resistive memory, nanowire memory, ferroelectric transistor random access memory (FeTRAM), magnetoresistive random access memory (MRAM), and spin transfer torque (STT)-MRAM.

24. A hardware platform comprising:
a processor;
a nonvolatile storage device coupled with the processor and mounted on the hardware platform; and
hardware logic to:
determine whether functional firmware to boot the hardware platform is stored on the nonvolatile storage device;
in response to a determination that the nonvolatile storage device lacks functional firmware, access firmware from a source via an external hardware interface;
store the firmware on the nonvolatile storage device via memory access commands; and
initiate a boot sequence for the hardware platform from the firmware stored on the nonvolatile storage device;
wherein the hardware logic comprises a controller device, and wherein the controller device is to access the firmware for the controller device.

25. The hardware platform of claim 24, wherein:
the nonvolatile storage device comprises a byte addressable nonvolatile storage device.

26. The hardware platform of claim 24, wherein the nonvolatile storage device comprises at least one of three dimensional (3D) cross point memory, phase change memory, resistive memory, nanowire memory, ferroelectric transistor random access memory (FeTRAM), magnetoresistive random access memory (MRAM), or spin transfer torque (STT)-MRAM.

27. The hardware platform of claim 24, wherein the hardware logic to store the firmware on the nonvolatile storage device is to:
train an interface between the processor and the nonvolatile storage device in a low speed mode; and
transfer the firmware to the nonvolatile storage device in a high speed mode.

28. The hardware platform of claim 24, wherein the hardware logic is to access the firmware for a processor of the hardware platform.

29. The hardware platform of claim 24, wherein the hardware platform comprises a two-level memory (2LM) system, and the nonvolatile storage device comprises a second level memory device in the 2LM.

30. The hardware platform of claim 24, wherein the nonvolatile storage device comprises far memory, and a second memory device comprises near memory.

* * * * *